United States Patent
Adachi

(10) Patent No.: US 8,010,730 B2
(45) Date of Patent: Aug. 30, 2011

(54) BUS CONVERTER, SEMICONDUCTOR DEVICE, AND NOISE REDUCTION METHOD OF BUS CONVERTER AND SEMICONDUCTOR DEVICE

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 10 days.

(21) Appl. No.: 12/144,956

(22) Filed: Jun. 24, 2008

(65) Prior Publication Data

US 2009/0031060 A1 Jan. 29, 2009

(30) Foreign Application Priority Data

Jul. 24, 2007 (JP) ................................. 2007-192152

(51) Int. Cl.
*G06F 13/36* (2006.01)
*G06F 1/12* (2006.01)

(52) U.S. Cl. .................. 710/306; 710/315; 713/400

(58) Field of Classification Search .................. 710/11, 710/38, 51, 69, 105, 305–307, 315, 316; 713/400, 600

See application file for complete search history.

(56) References Cited

U.S. PATENT DOCUMENTS

| | | | |
|---|---|---|---|
| 5,191,581 A | | 3/1993 | Woodbury et al. |
| 5,481,555 A | * | 1/1996 | Wade et al. ............... 714/812 |
| 5,586,081 A | * | 12/1996 | Mills et al. ............... 365/230.08 |
| 5,600,839 A | * | 2/1997 | MacDonald ............... 713/322 |
| 5,673,400 A | * | 9/1997 | Kenny .................... 710/306 |
| 5,696,917 A | * | 12/1997 | Mills et al. ............... 711/1 |
| 5,809,022 A | * | 9/1998 | Byers et al. ............. 370/395.51 |
| 6,026,465 A | * | 2/2000 | Mills et al. ............... 711/103 |
| 6,163,584 A | * | 12/2000 | Weng et al. ............... 375/354 |
| 6,385,688 B1 | * | 5/2002 | Mills et al. ............... 711/103 |
| 6,510,484 B1 | * | 1/2003 | Kim et al. ............... 710/314 |
| 6,564,285 B1 | * | 5/2003 | Mills et al. ............... 711/103 |
| 7,275,171 B2 | * | 9/2007 | Kizer et al. ............... 713/400 |
| 7,395,450 B2 | * | 7/2008 | Karaki .................... 713/600 |
| 7,768,429 B2 | * | 8/2010 | Bae et al. ................. 341/58 |
| 2003/0165158 A1 | * | 9/2003 | Davies et al. ............. 370/465 |

FOREIGN PATENT DOCUMENTS

| | | |
|---|---|---|
| JP | H06-119290 | 4/1994 |
| JP | H08-84063 | 3/1996 |
| JP | 9-305649 | 11/1997 |
| JP | 3472556 | 9/2003 |
| JP | 2005-116586 | 4/2005 |

* cited by examiner

*Primary Examiner* — Khanh Dang

(74) *Attorney, Agent, or Firm* — Dickstein Shapiro LLP

(57) ABSTRACT

A bus converter is disclosed that converts a signal of a synchronous bus into a signal of an asynchronous bus. The bus converter includes a control signal generation unit that generates n control signals synchronized at different timings of a predetermined synchronization signal, where n is an integer of two or more; and an output unit that outputs the signal of the synchronous bus divided into n signal groups based on a control using the n control signals.

20 Claims, 34 Drawing Sheets

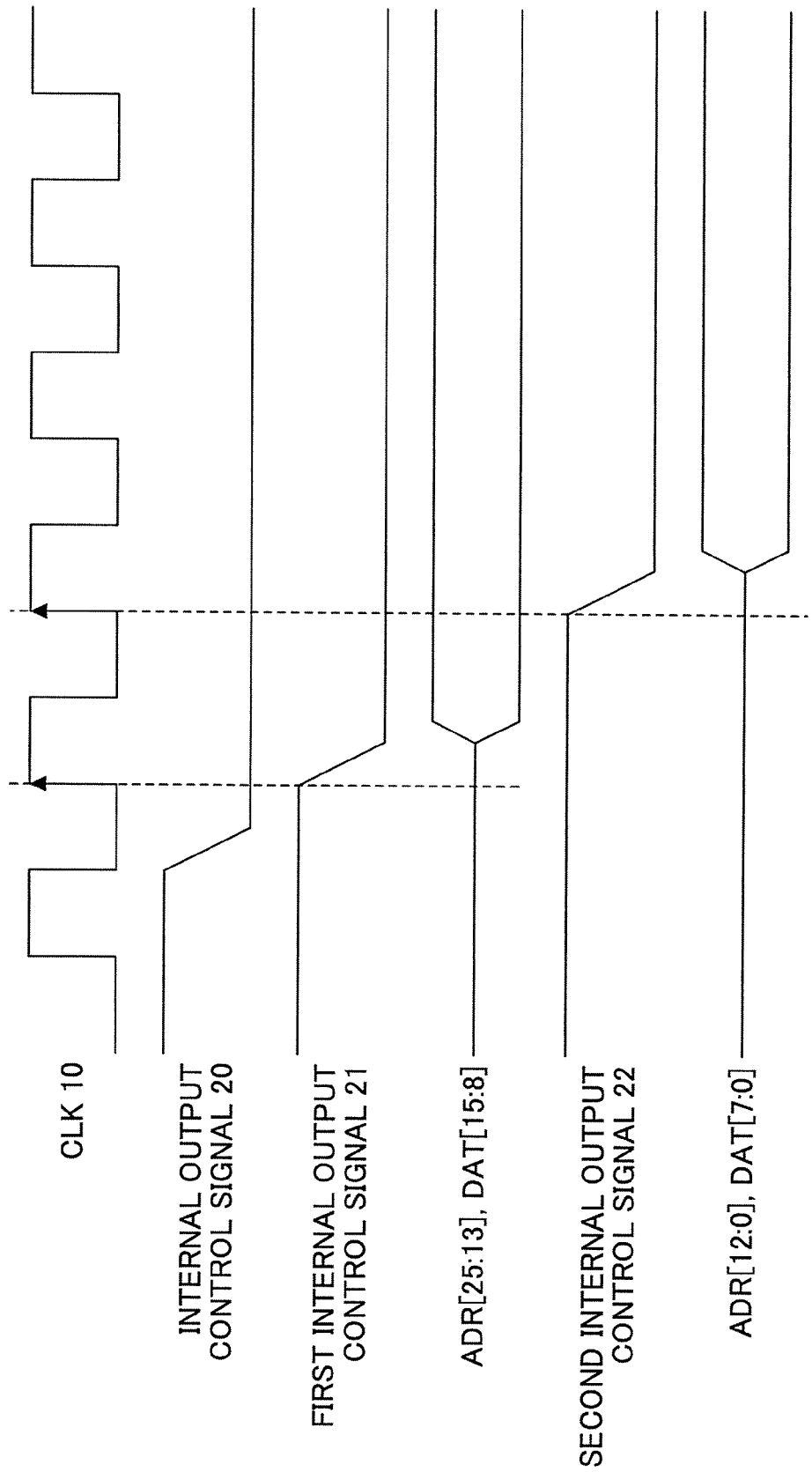

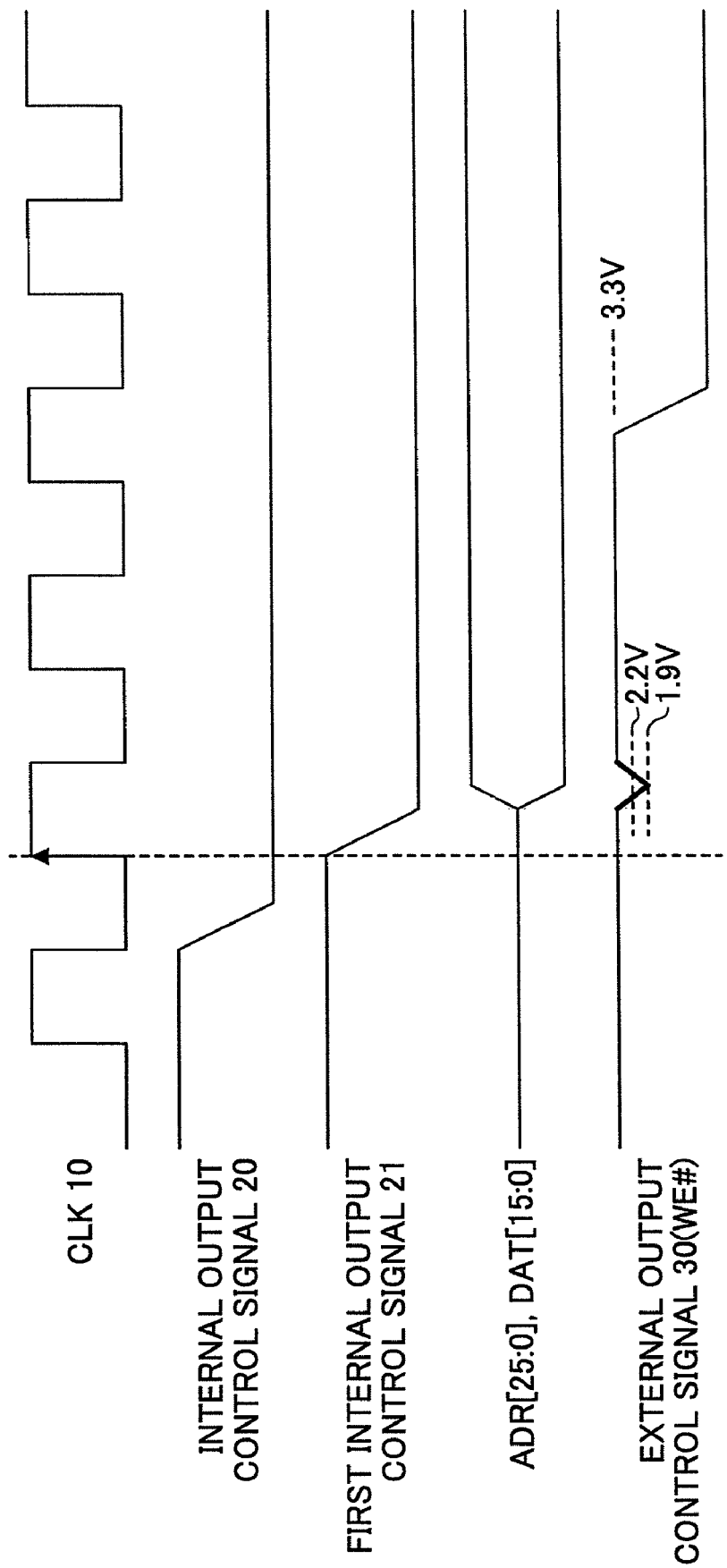

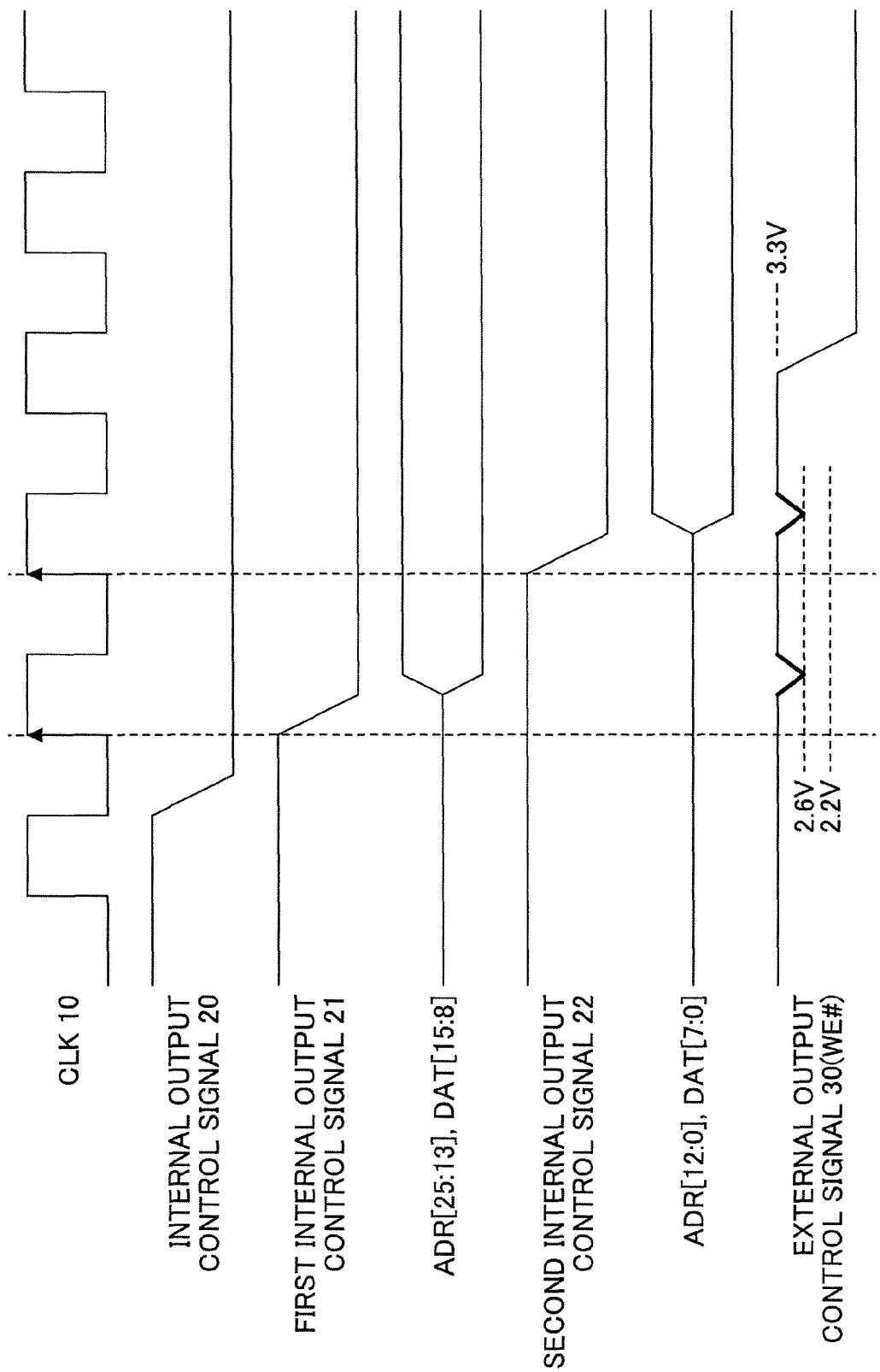

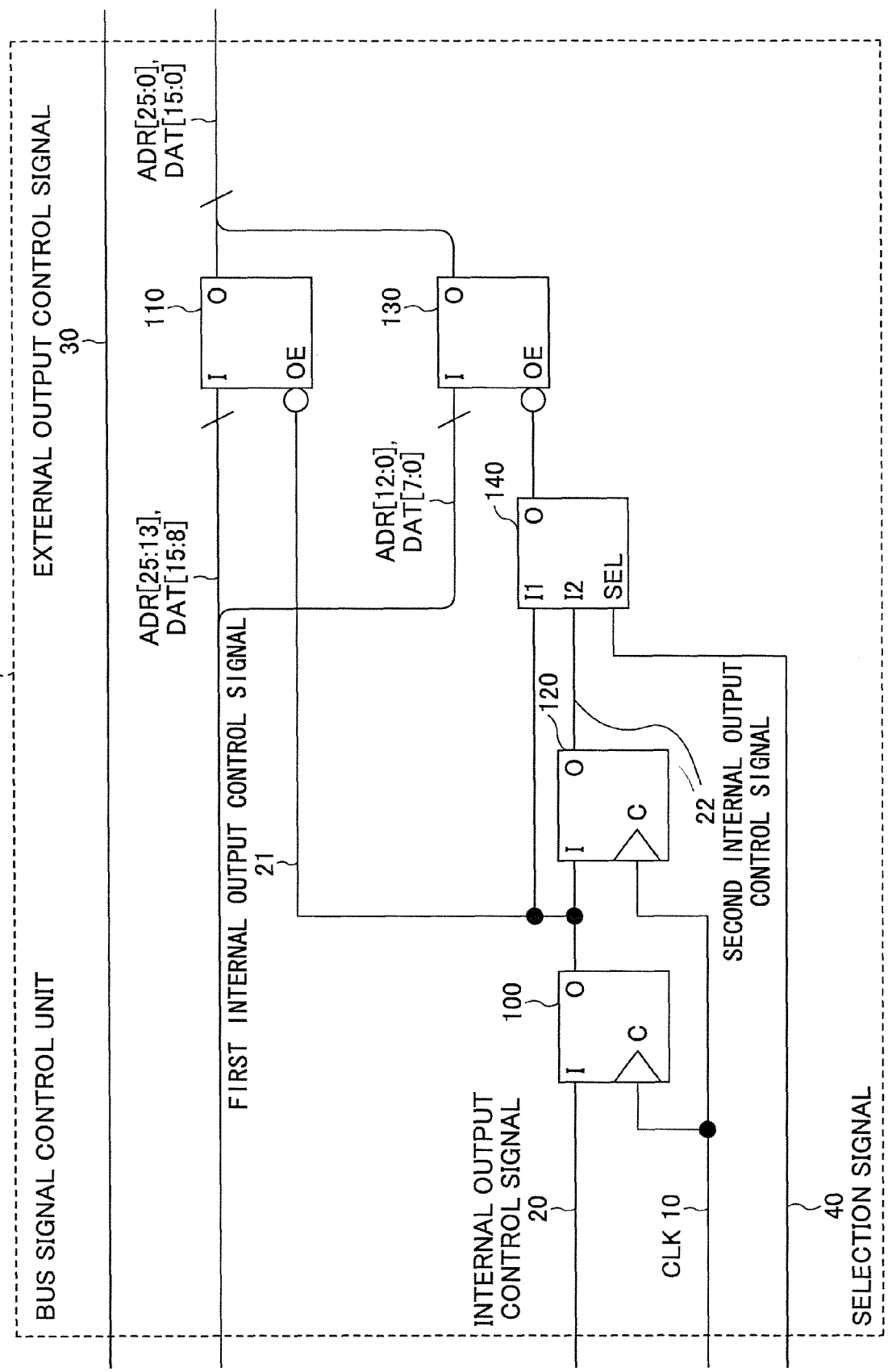

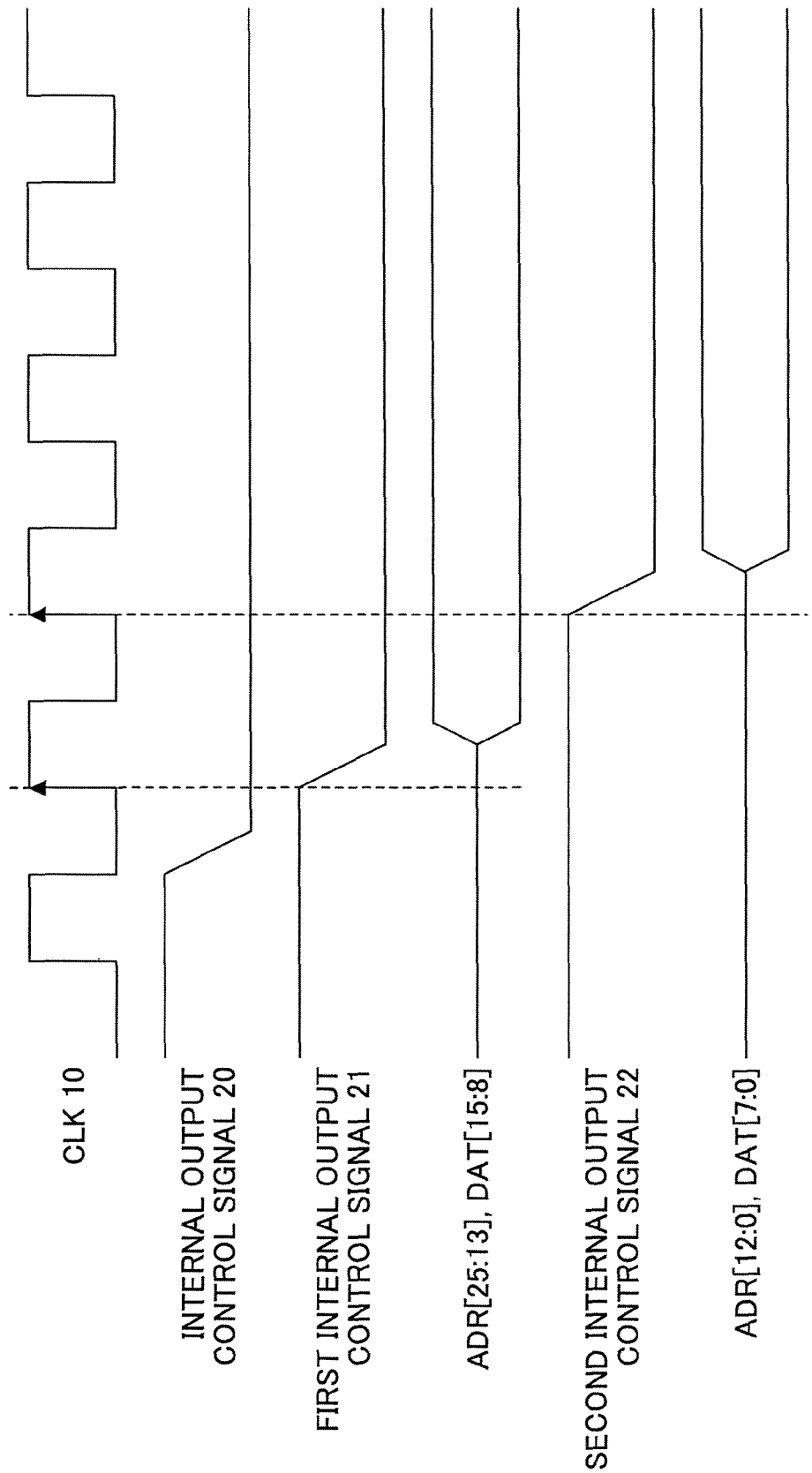

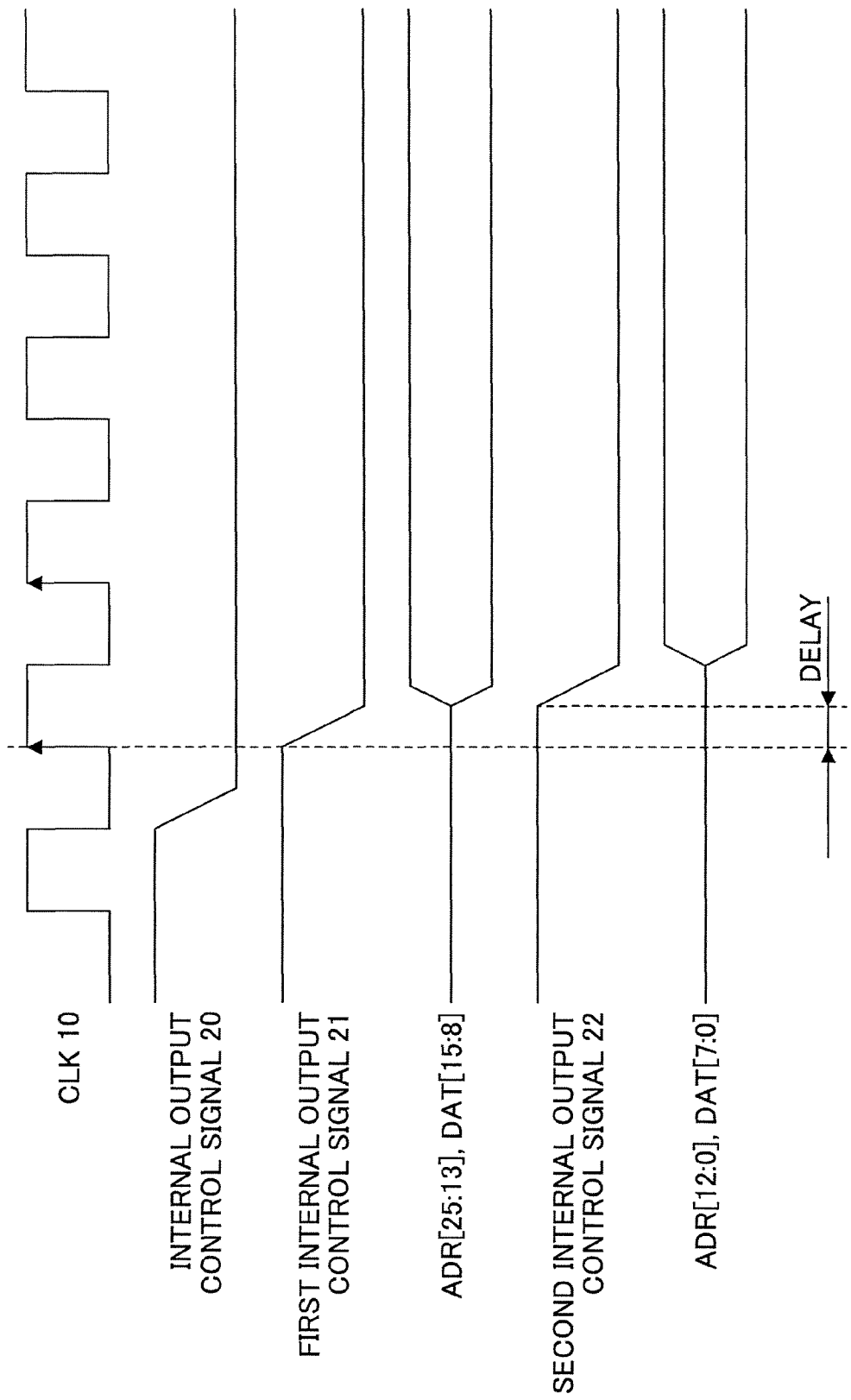

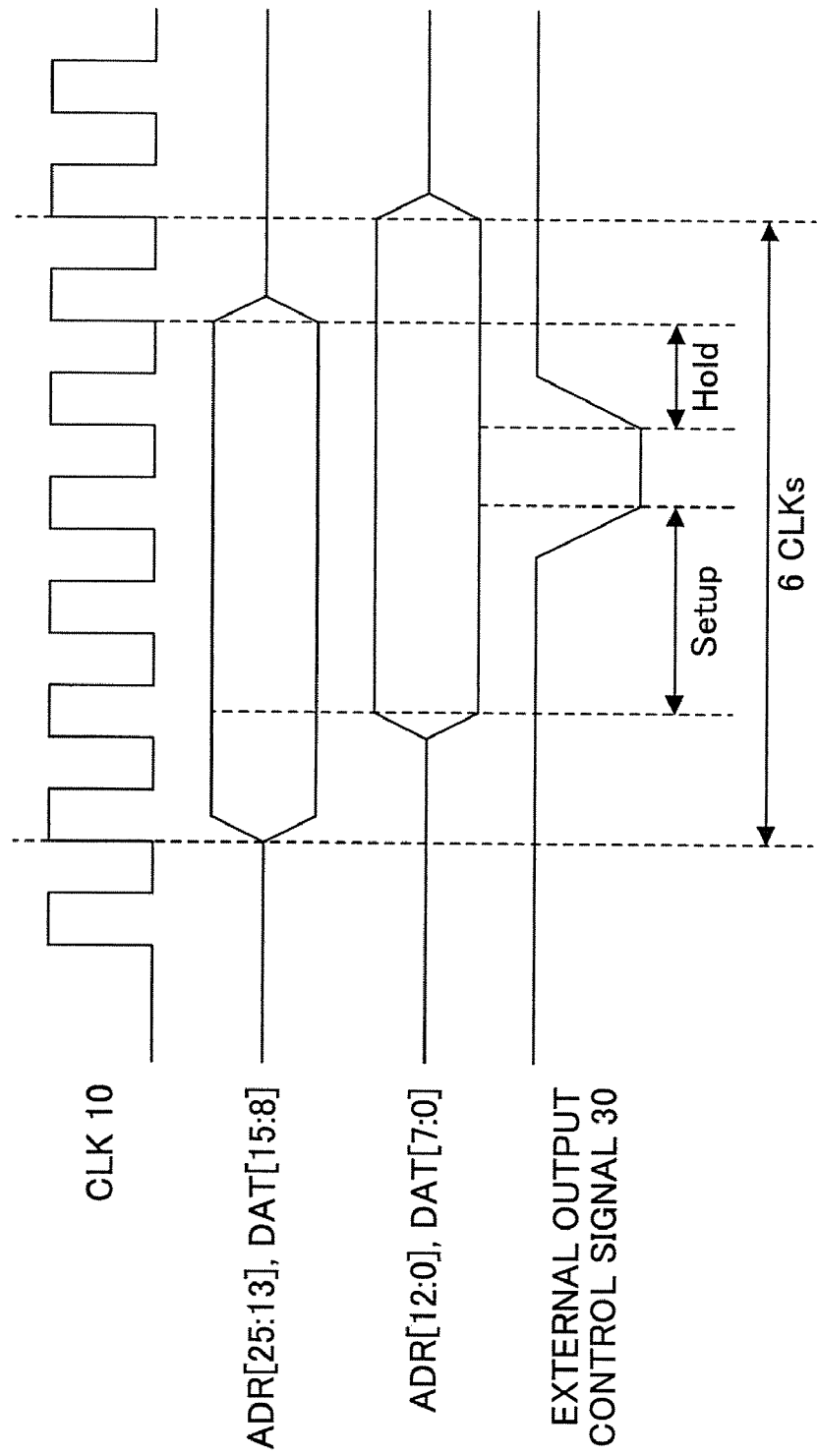

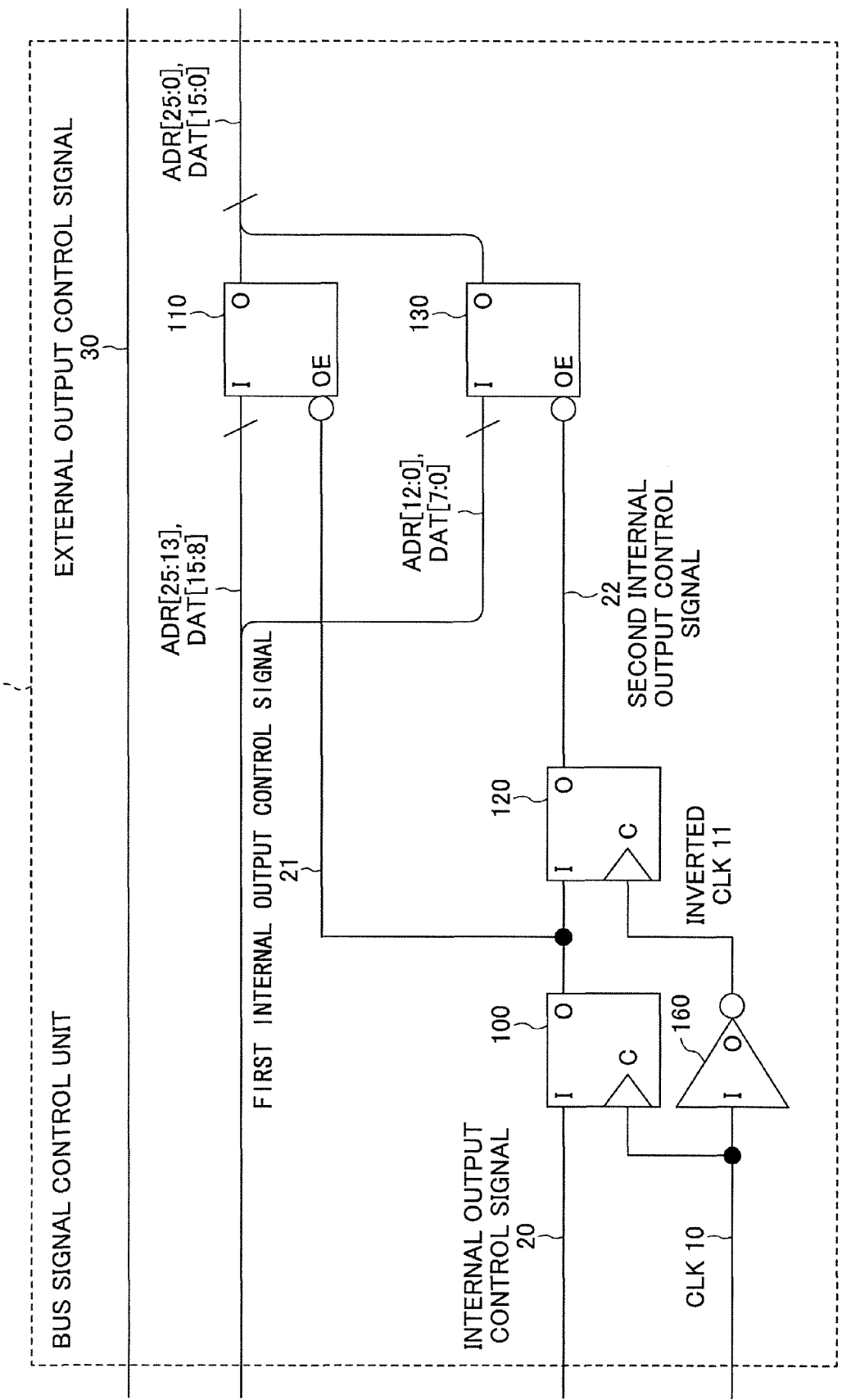

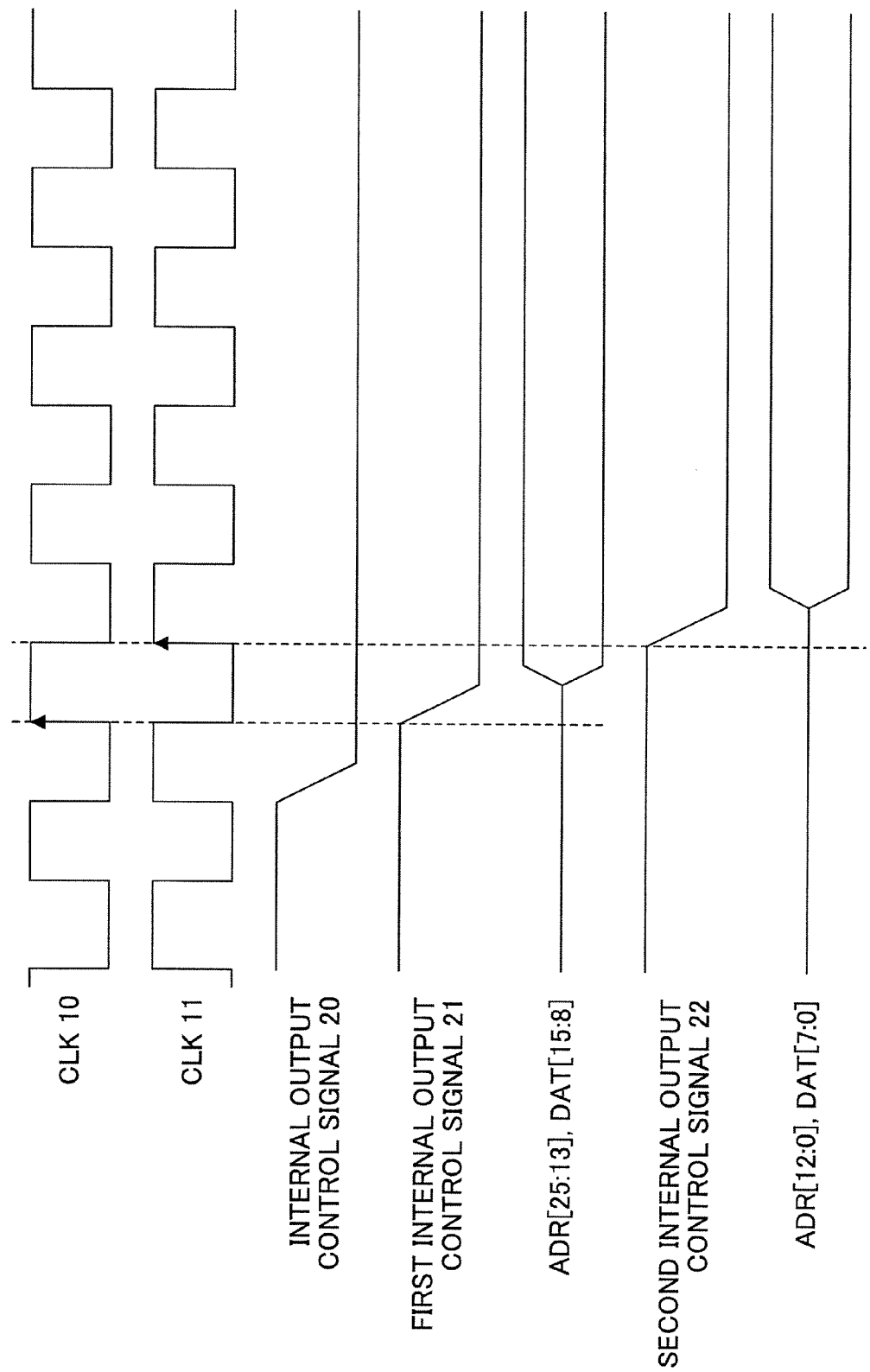

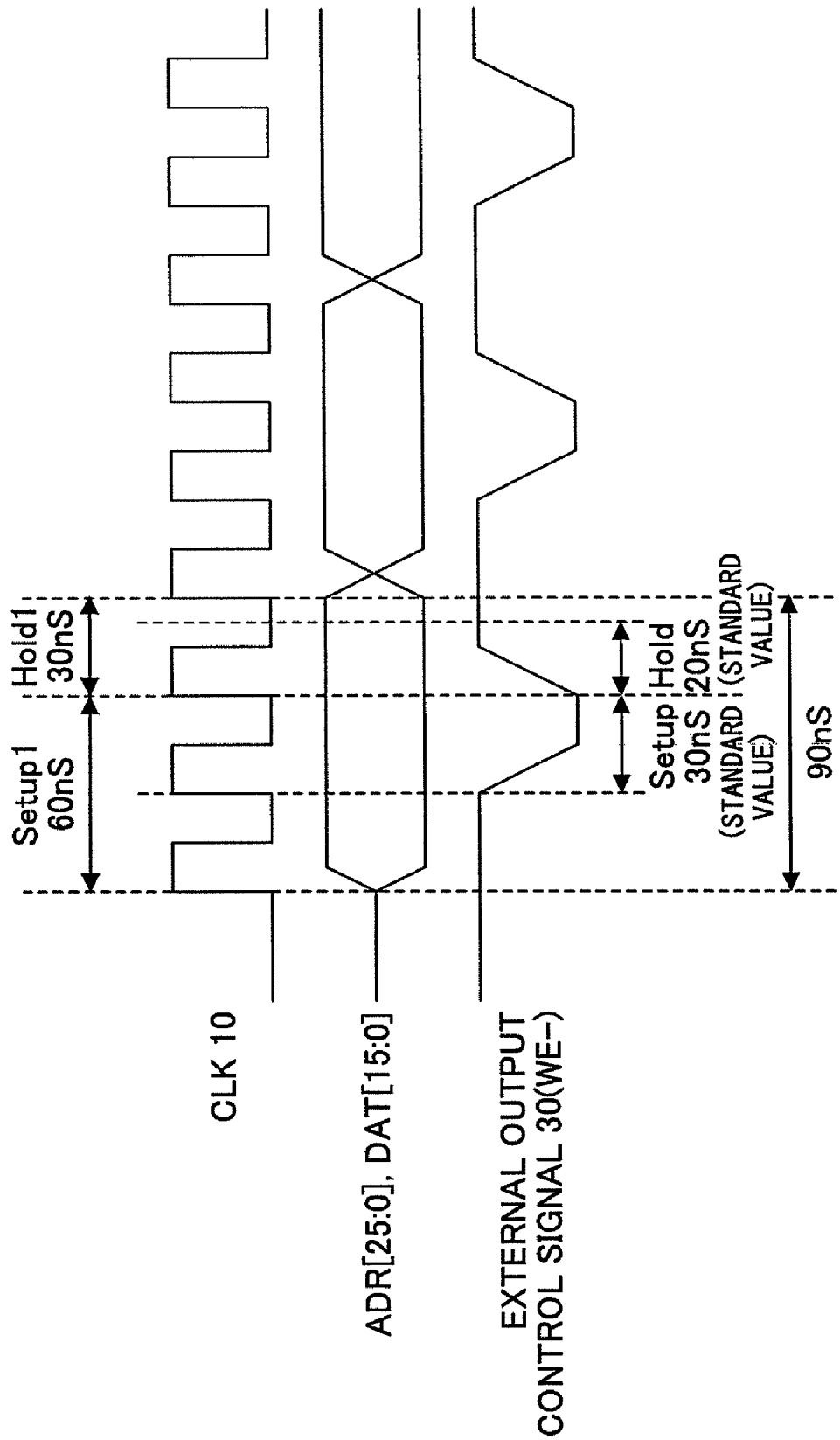

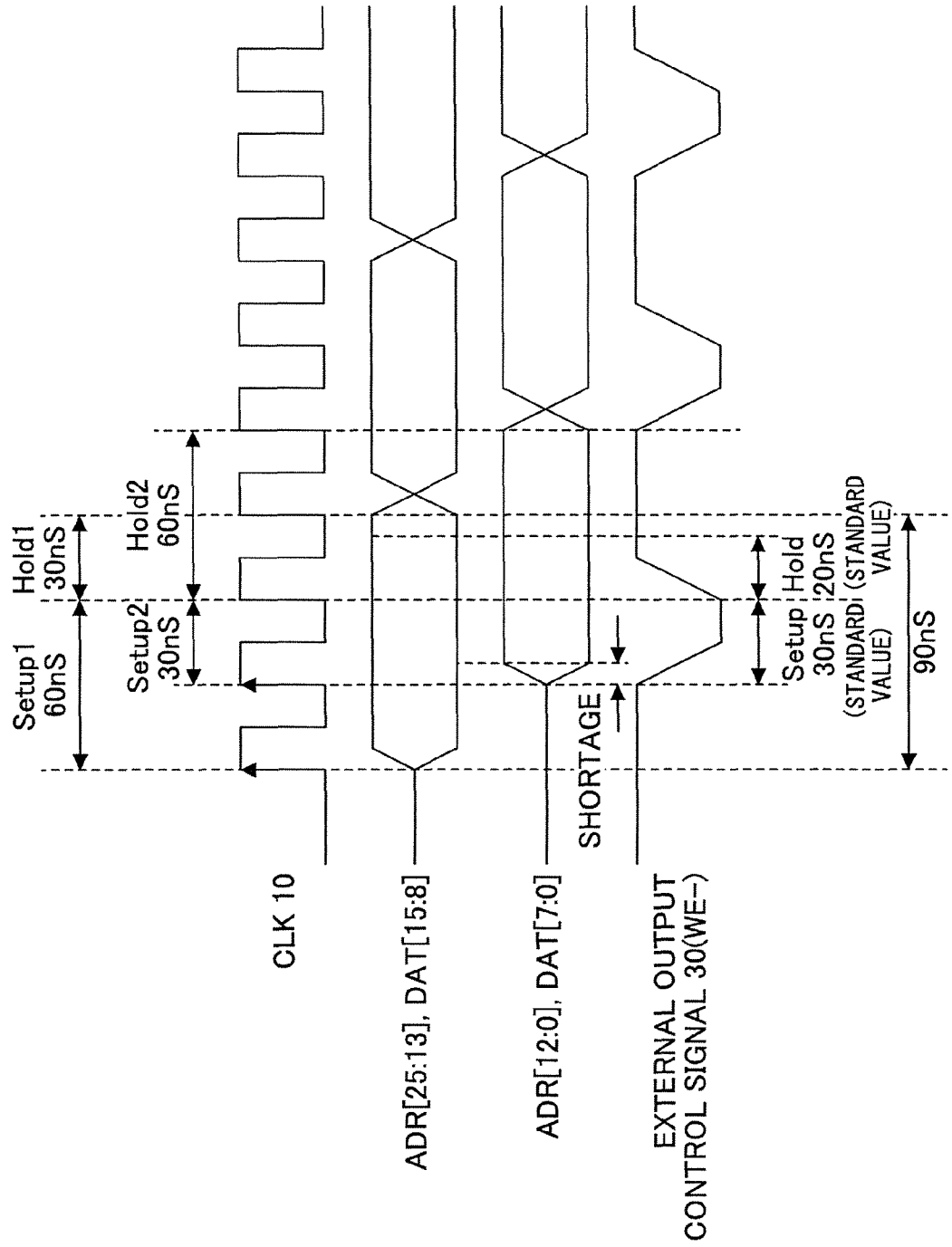

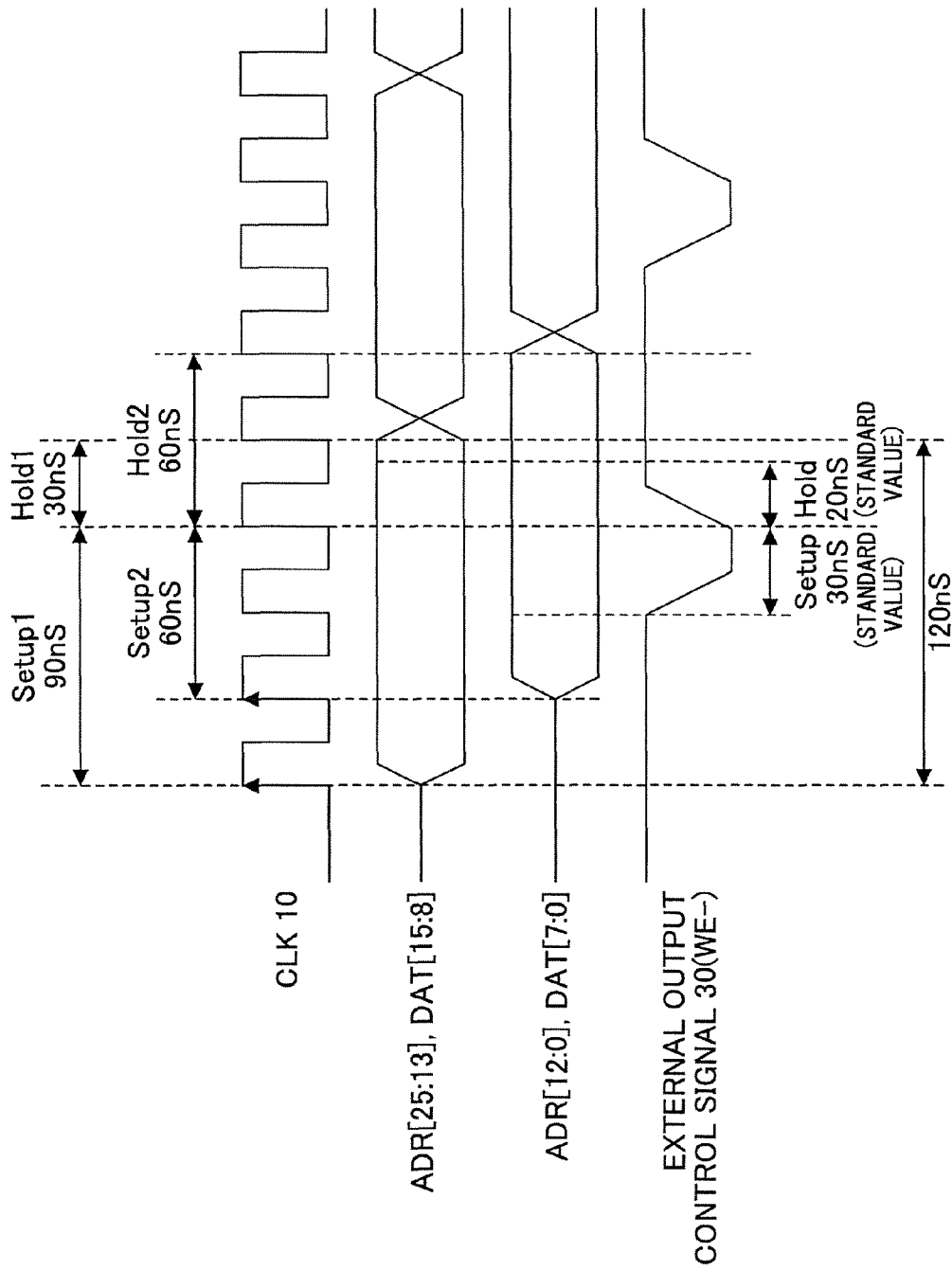

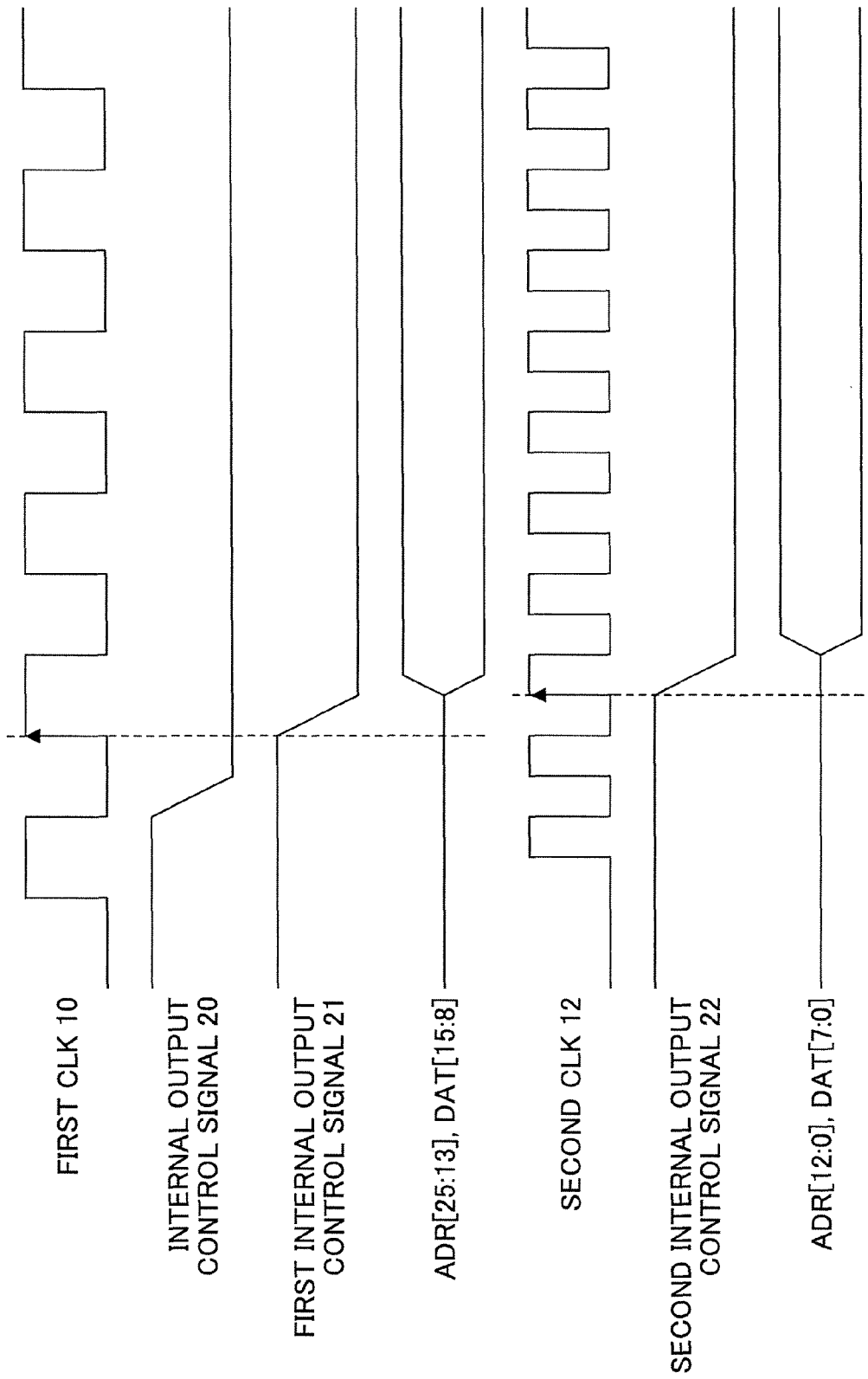

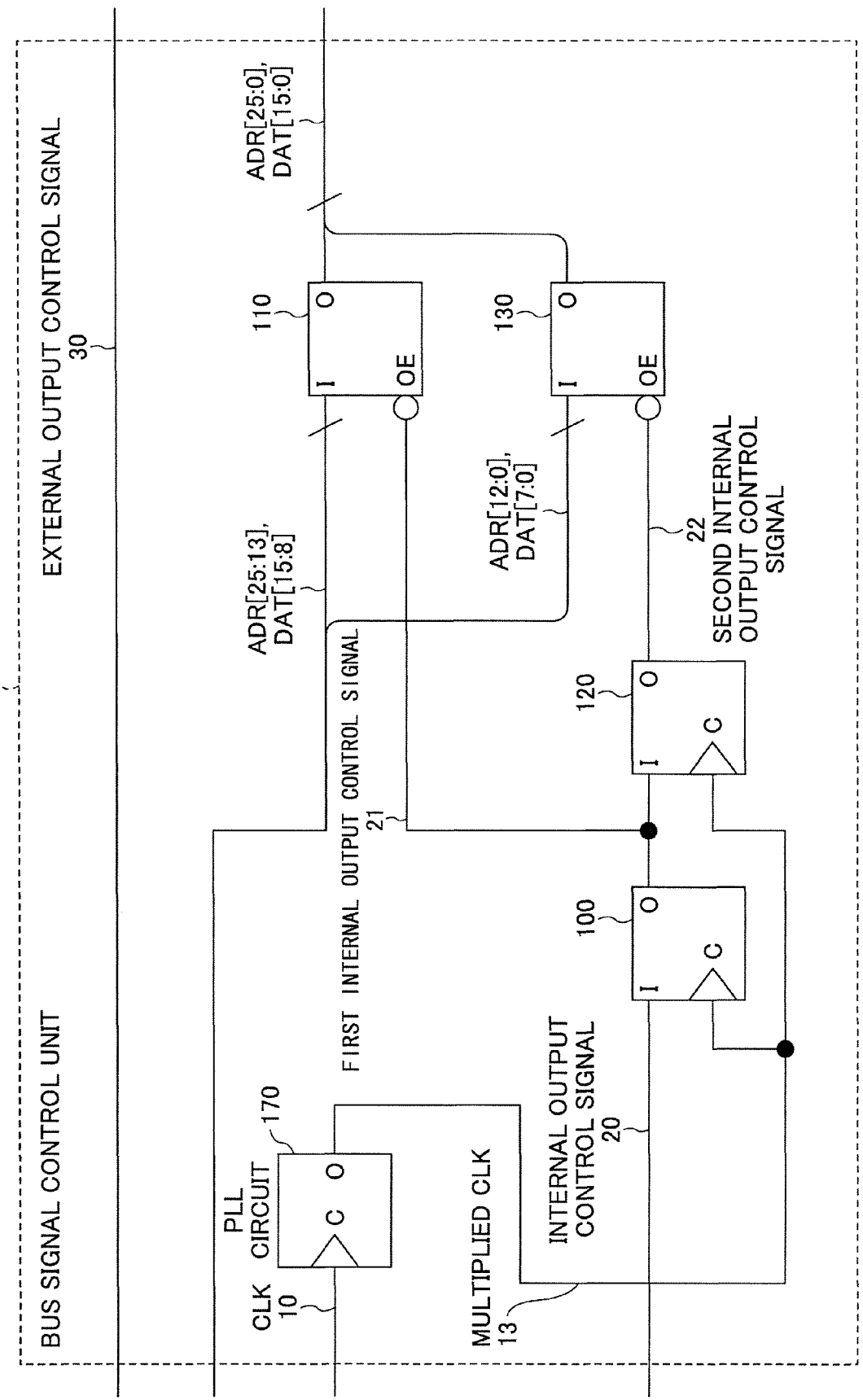

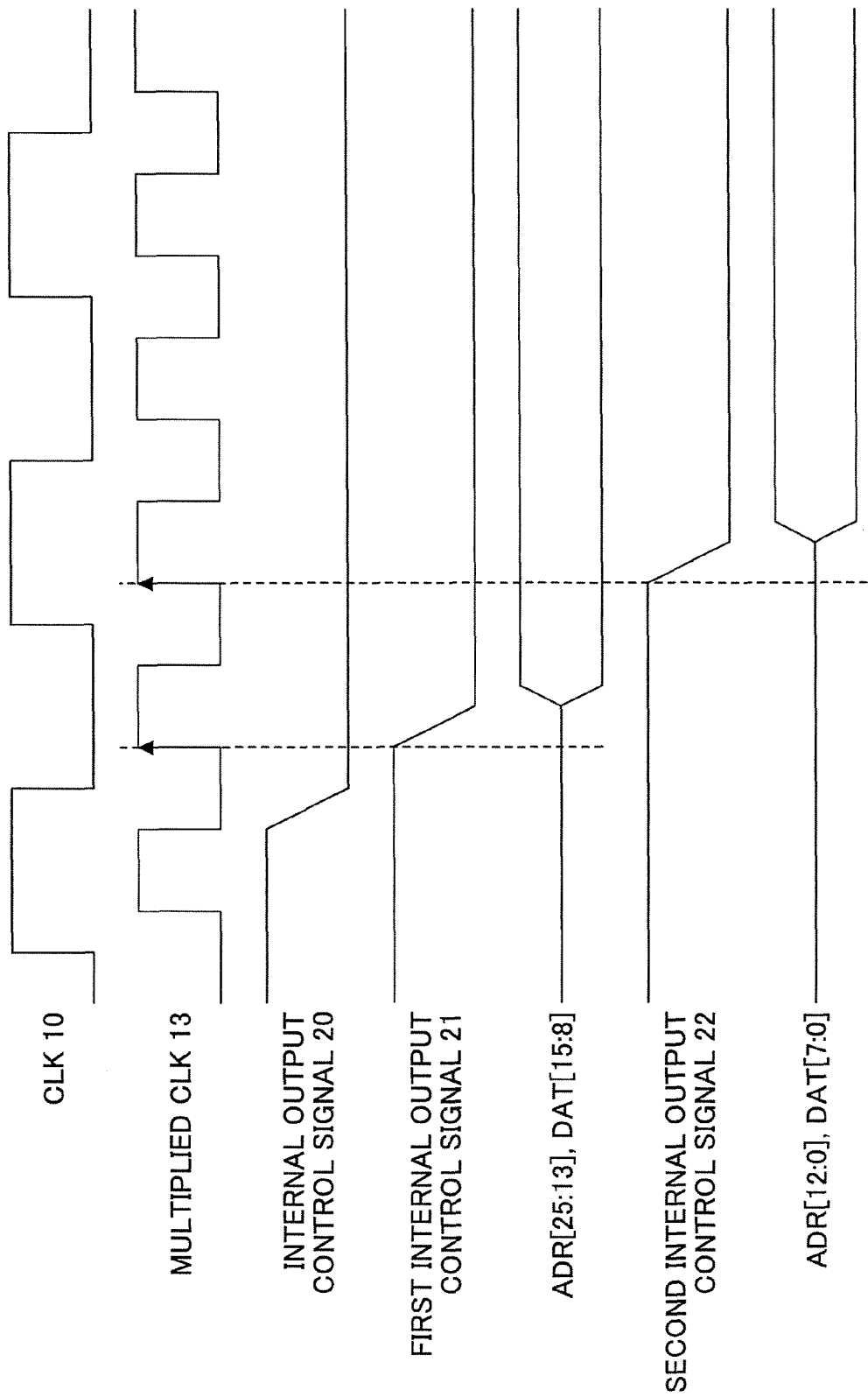

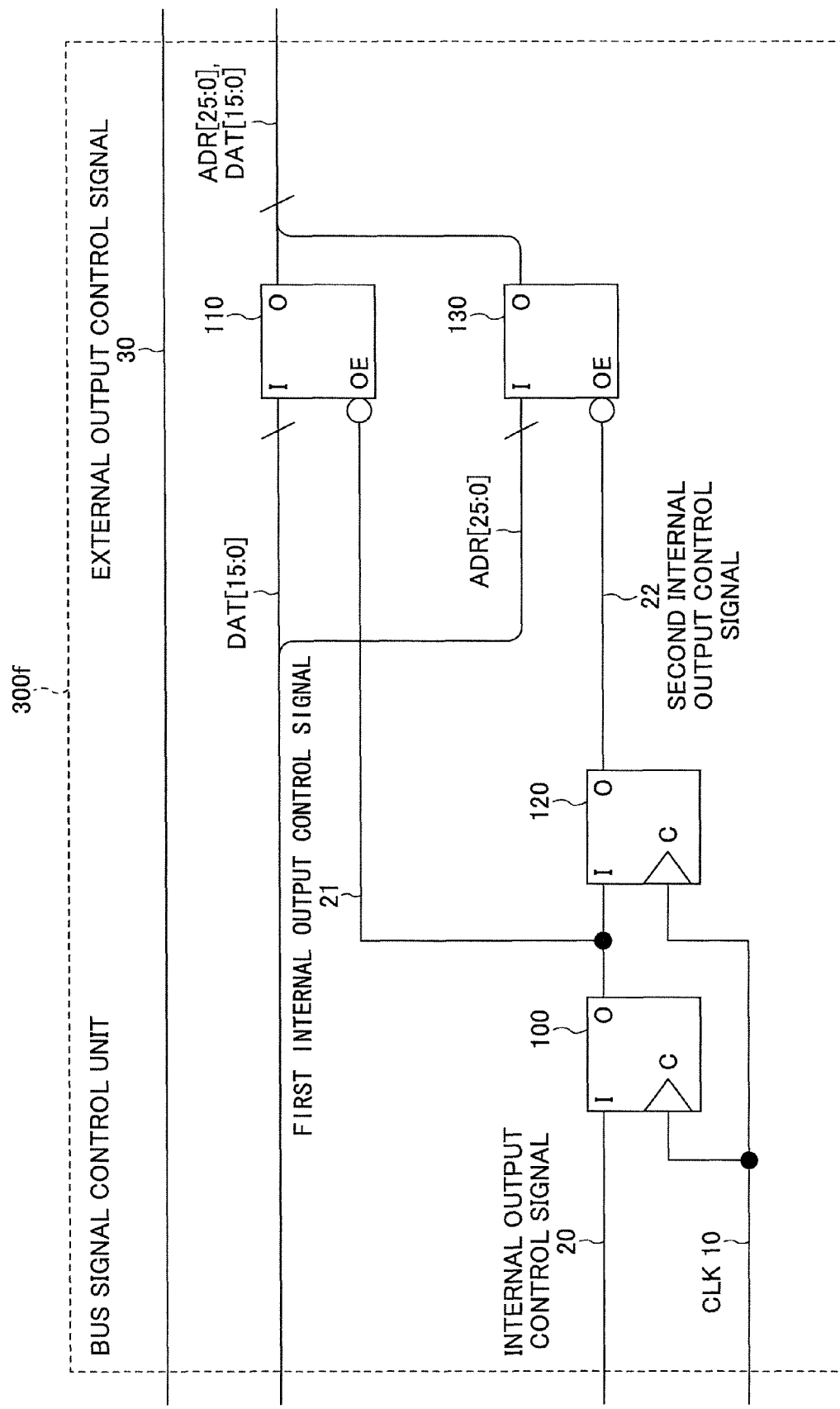

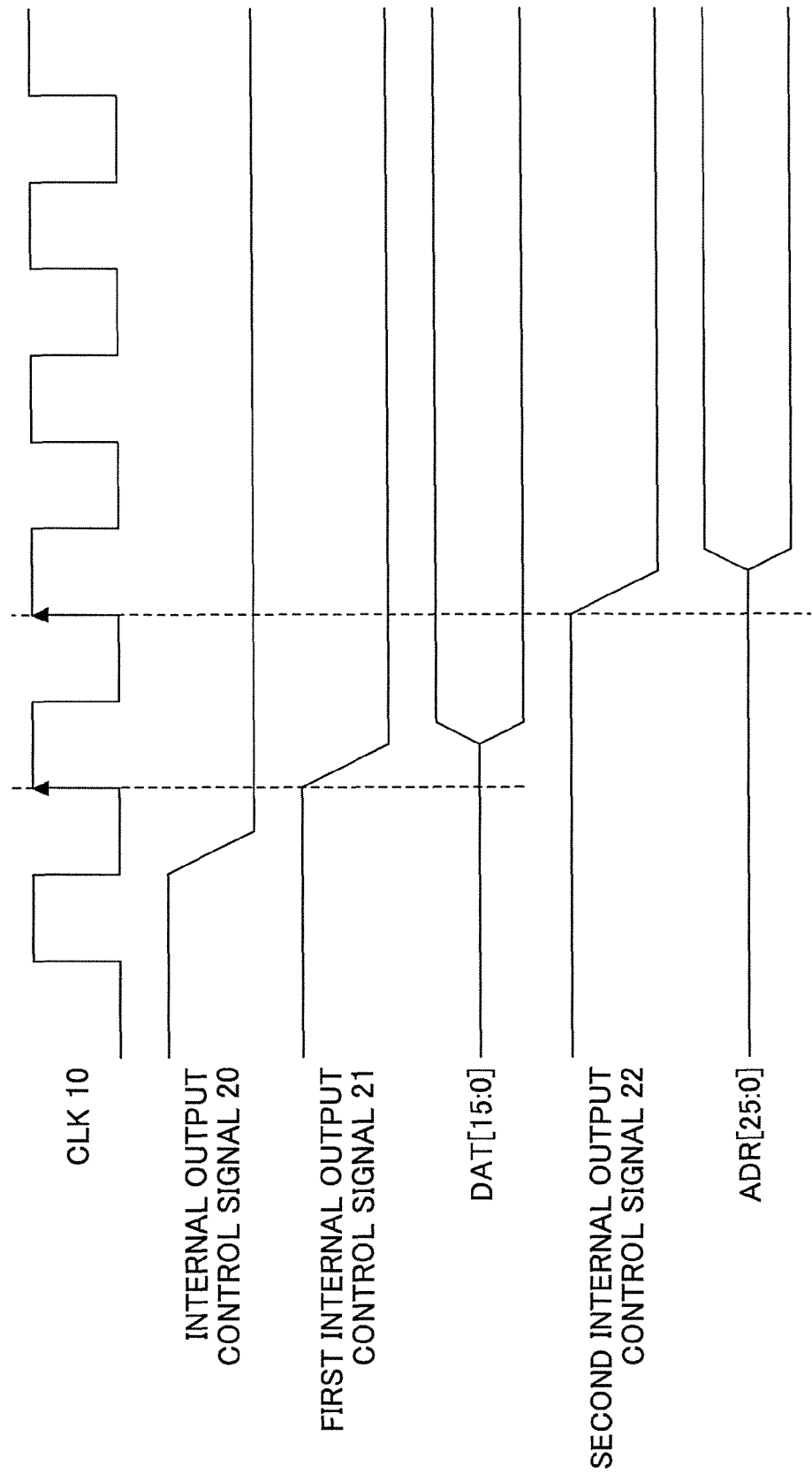

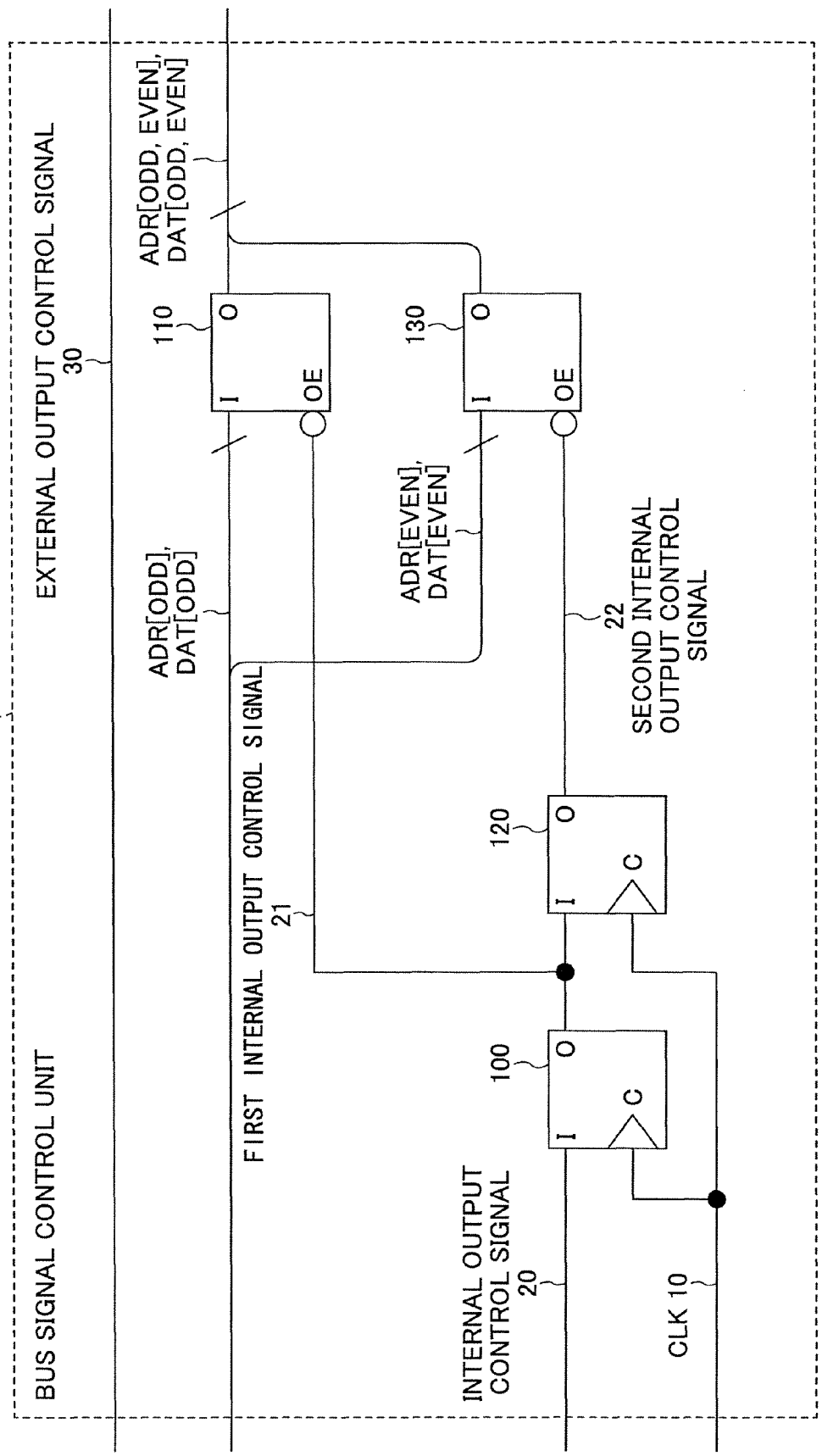

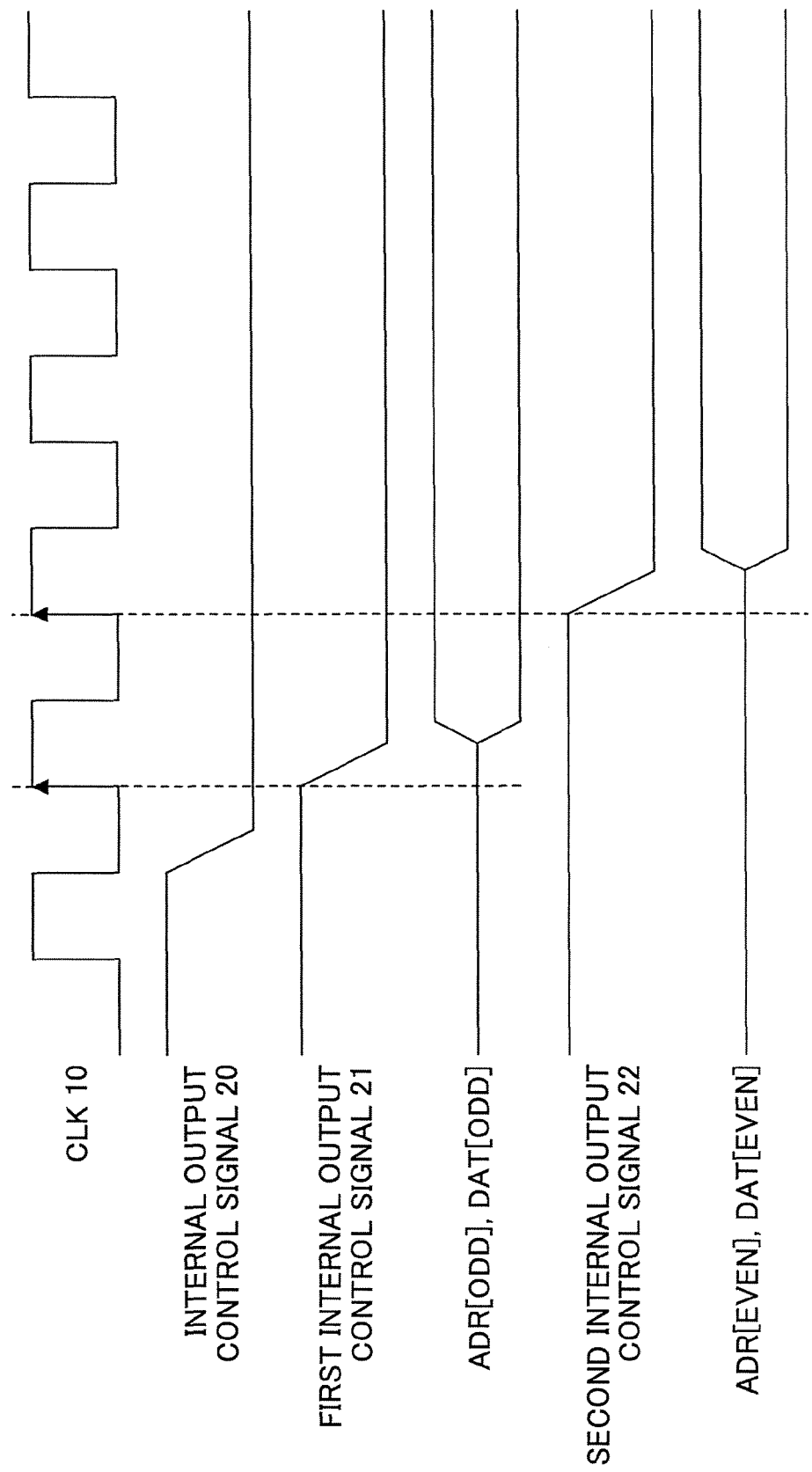

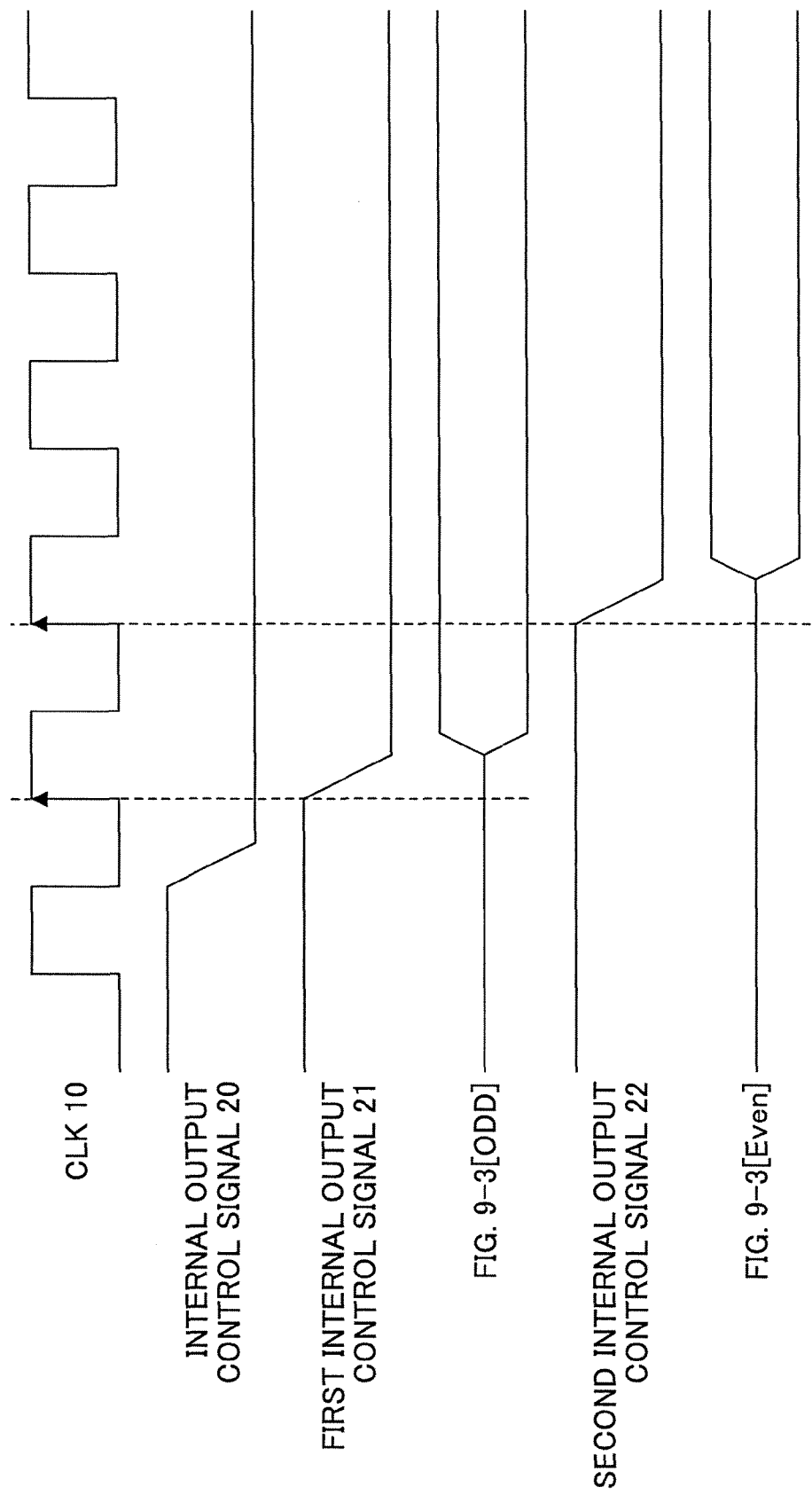

FIG.9C

| 1 | GND |
|---|---|
| 2 | D3 |
| 3 | D4 |
| 4 | D5 |
| 5 | D6 |
| 6 | D7 |
| 7 | CE1# |
| 8 | A10 |
| 9 | OE# |
| 10 | A11 |
| 11 | A9 |
| 12 | A8 |
| 13 | A13 |
| 14 | A14 |
| 15 | WE# |
| 16 | IREQ# |
| 17 | VCC |
| 18 | VPP |
| 19 | A16 |
| 20 | A15 |
| 21 | A12 |
| 22 | A7 |
| 23 | A6 |
| 24 | A5 |
| 25 | A4 |
| 26 | A3 |
| 27 | A2 |
| 28 | A1 |
| 29 | A0 |
| 30 | D0 |
| 31 | D1 |
| 32 | D2 |
| 33 | IOIS16# |
| 34 | GND |

| 35 | GND |
|---|---|
| 36 | CD1# |
| 37 | D11 |
| 38 | D12 |
| 39 | D13 |
| 40 | D14 |
| 41 | D15 |
| 42 | CE2# |
| 43 | VS1# |
| 44 | IORD# |
| 45 | IOWR# |
| 46 | A17 |
| 47 | A18 |
| 48 | A19 |
| 49 | A20 |
| 50 | A21 |
| 51 | VCC |
| 52 | VPP |
| 53 | A22 |
| 54 | A23 |
| 55 | A24 |
| 56 | A25 |
| 57 | VS2# |
| 58 | RESET |
| 59 | WAIT# |
| 60 | INPACK# |
| 61 | REG# |
| 62 | SPKR# |
| 63 | STSCHG# |
| 64 | D8 |
| 65 | D9 |
| 66 | D10 |
| 67 | CD2# |
| 68 | GND |

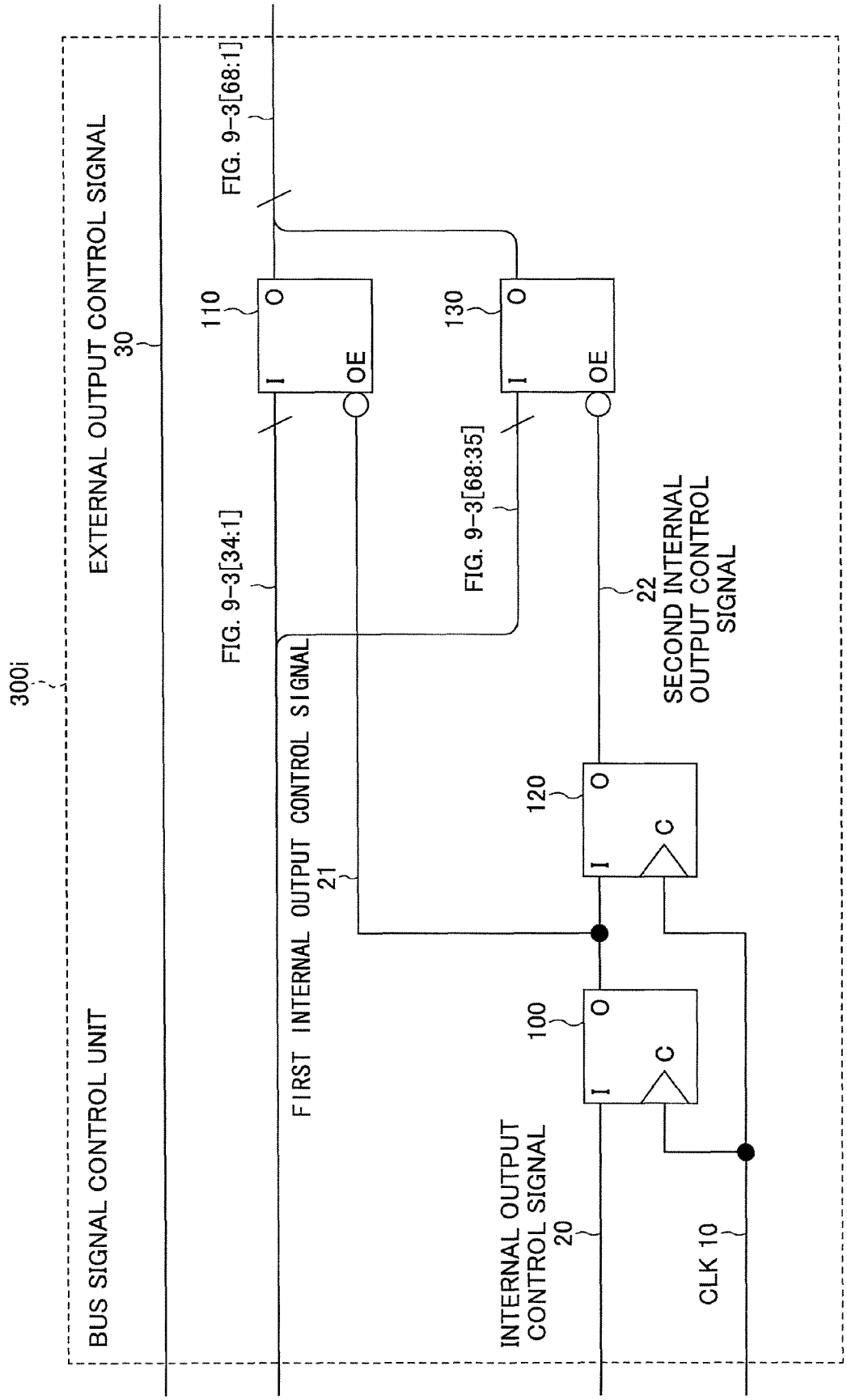

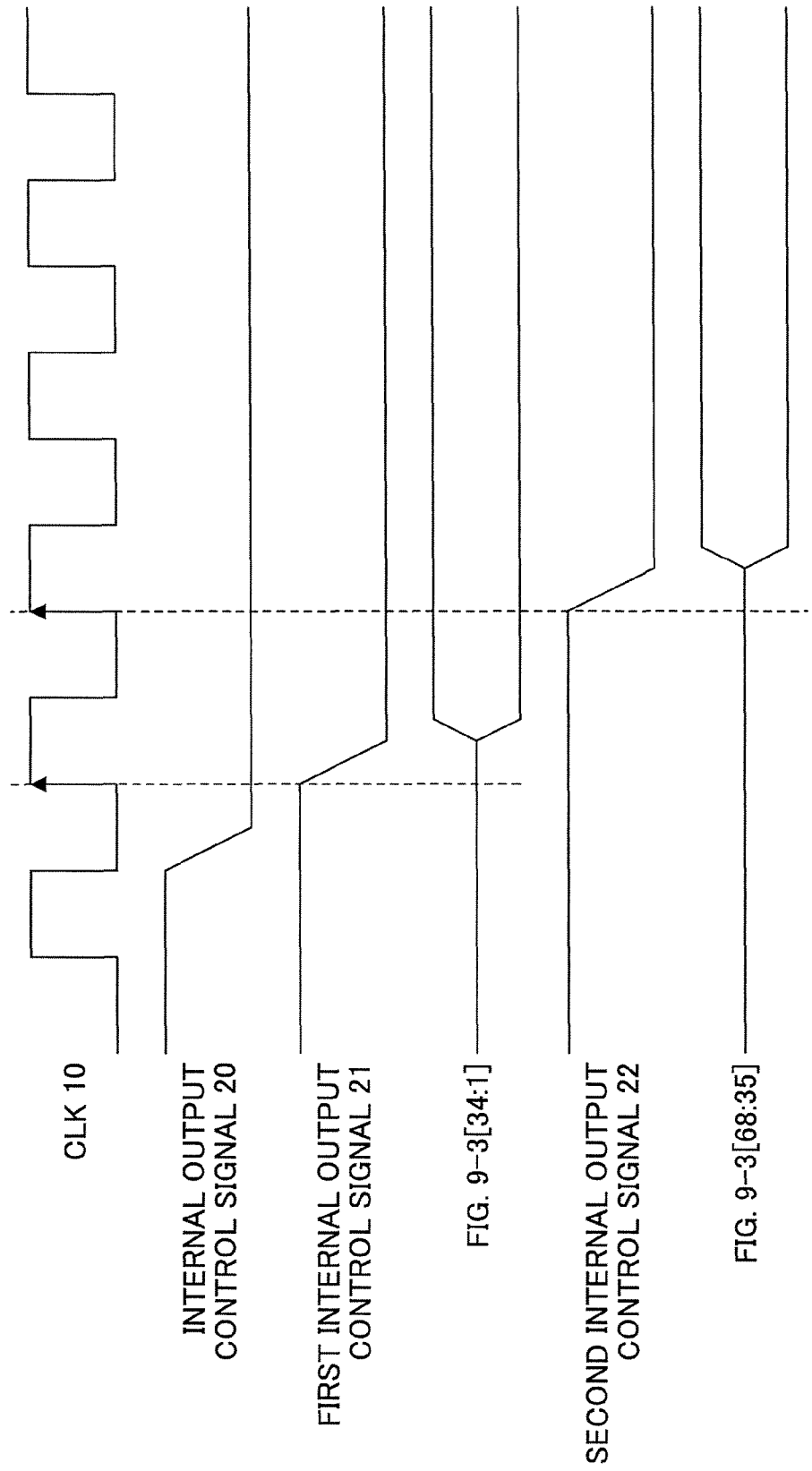

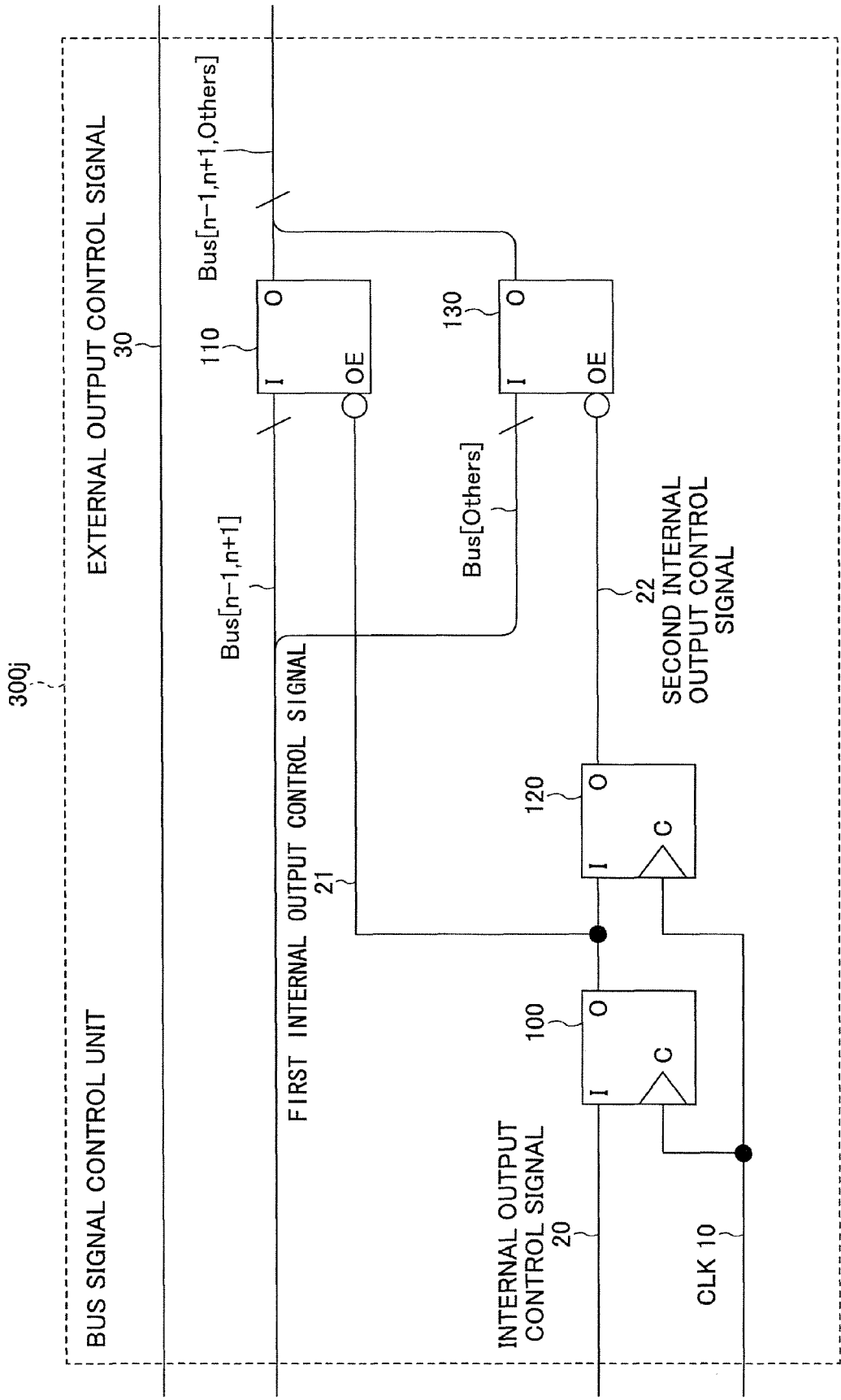

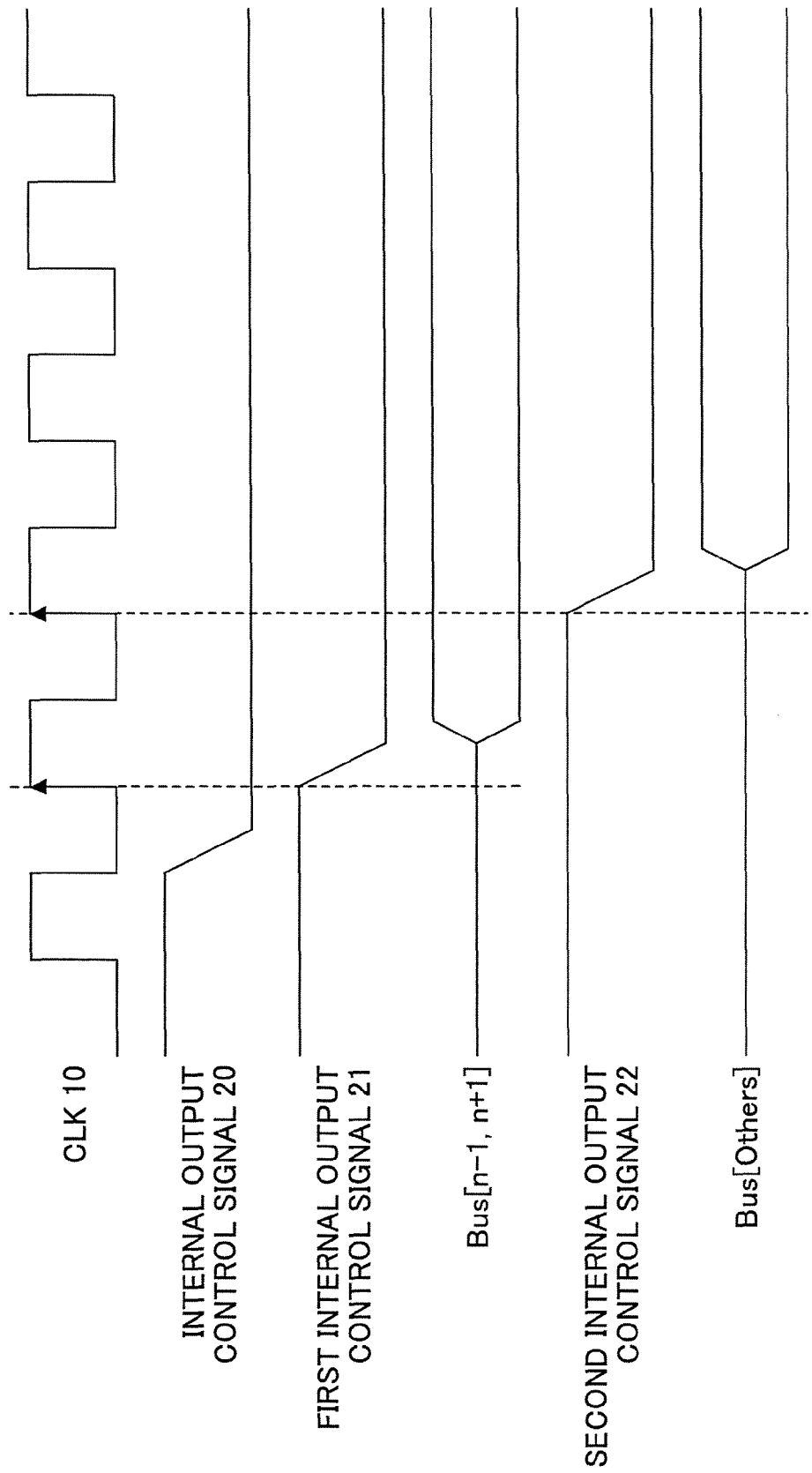

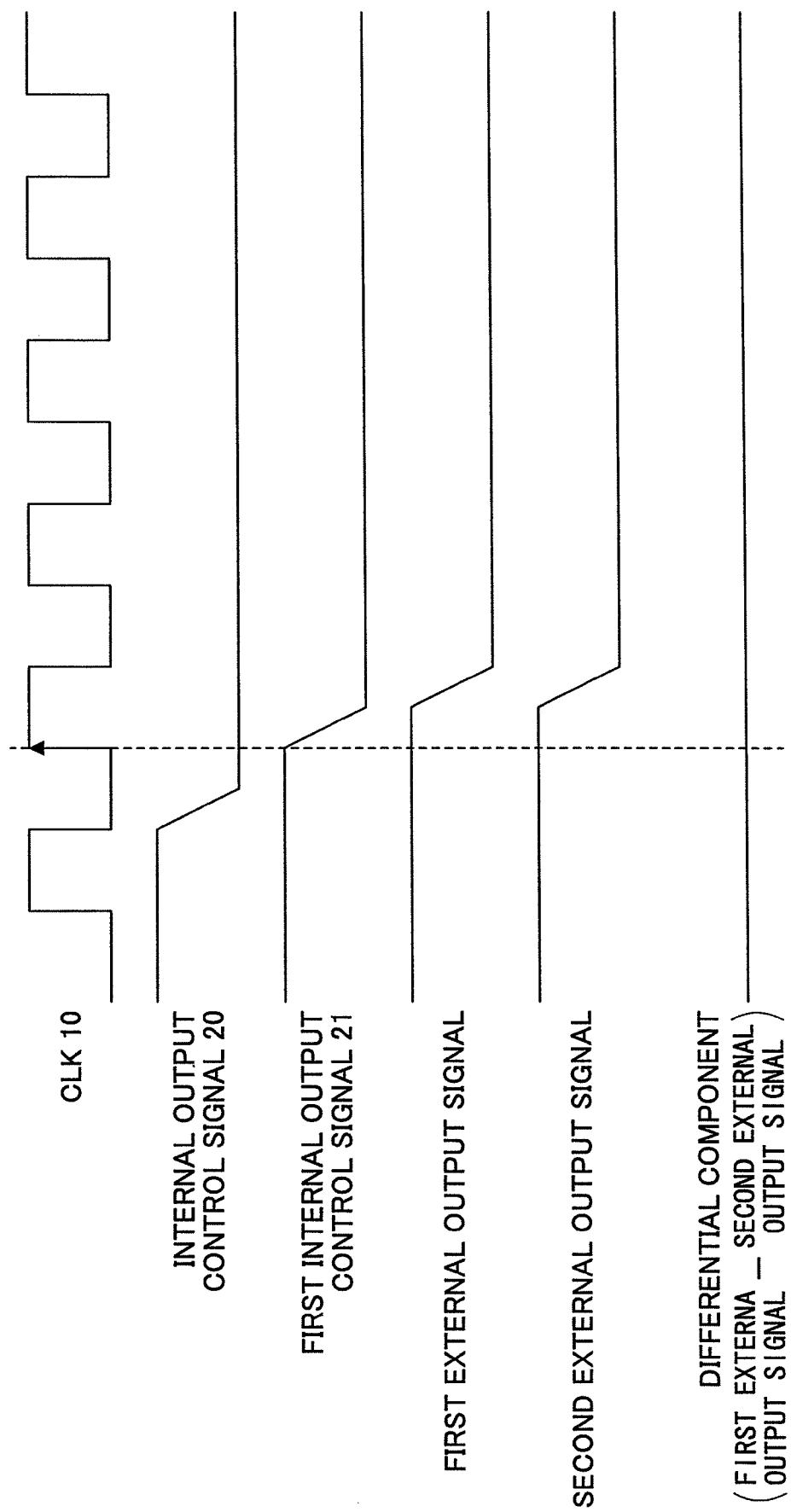

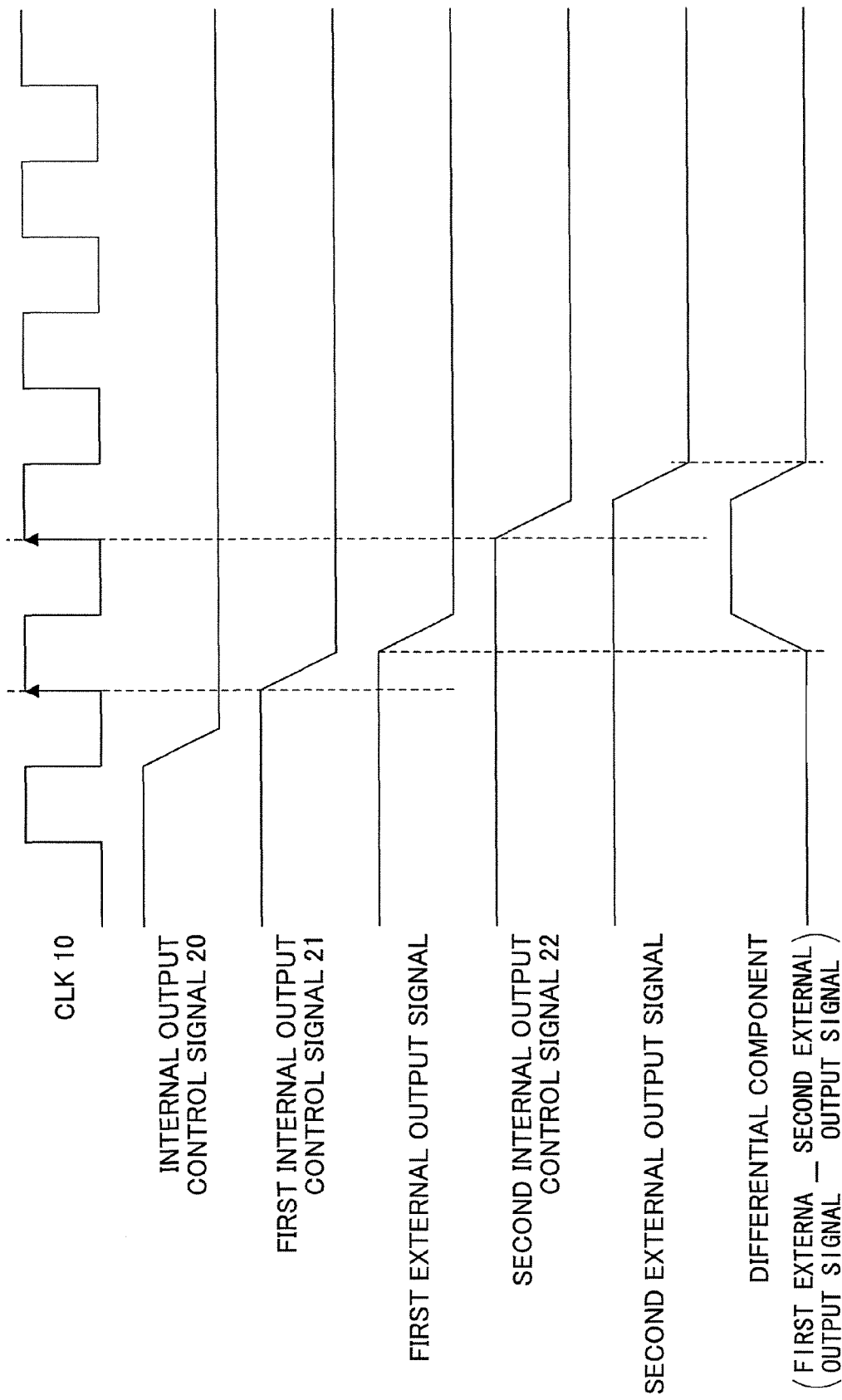

BUS CONVERTER, SEMICONDUCTOR DEVICE, AND NOISE REDUCTION METHOD OF BUS CONVERTER AND SEMICONDUCTOR DEVICE

BACKGROUND OF THE INVENTION

1. Field of the Invention

The present invention relates to a bus converter capable of reducing simultaneous switching noise, a semiconductor device on which the bus converter is mounted, and a method of reducing simultaneous switching noise.

2. Description of the Related Art

When data transmission is switched from a synchronous bus to an asynchronous bus, all bus signals are shifted at the timing of a synchronization signal. At that time, simultaneous switching noise is caused. Here, the simultaneous switching noise refers to the noise caused according to large fluctuations in the power supply and the ground potential when many signals are switched at the same timing to feed a high current through a circuit.

In the case of the synchronous bus, even if simultaneous switching noise is caused, there is no problem in data transmission itself provided that the simultaneous switching noise is suppressed until the next signal synchronization. However, in the case of the asynchronous bus, if the state of a control signal such as a writing request signal is changed, the function of the control signal becomes effective, which may cause a malfunction in data transmission.

Therefore, in order to reduce simultaneous switching noise, various techniques have been proposed.

For example, in a method of arranging a buffer for generating a time difference between signals, fluctuations are caused in the time difference generated by the arranged buffer, for example, when fluctuations at the time of manufacturing, design rules, and manufacturing processes are changed. In order to accurately control the time difference between the signals, it is necessary to select an optimum buffer with respect to the time difference every time they are changed. Moreover, in this method, it is not possible to set the presence or absence of the generation of the time difference between the signals. Furthermore, in a method of lowering the current driving ability of a buffer, the switching noise of signals and simultaneous switching noise are reduced. However, in this method, electrical characteristics such as the rise time and the fall time of the signals are changed. Therefore, there may be a possibility of affecting compatibility such as disabling of components that have normally operated before the current driving ability has been changed. A buffer circuit considering an operating speed when the voltage of a power supply is lowered has been proposed, but its circuit configuration is complicated. Therefore, electrical characteristics affecting compatibility such as the driving ability of a signal output may be changed (see, for example, JP-A-8-84063).

SUMMARY OF THE INVENTION

As described above, the various techniques of reducing simultaneous switching noise have been proposed. However, in the method of arranging a buffer, it is necessary to select an optimum buffer with respect to a time difference, for example, when manufacturing processes are changed. Moreover, in the method of changing the electrical characteristics of a buffer, there may be a possibility of affecting compatibility.

The present invention has been made in view of the above problems and may provide a bus converter capable of reducing simultaneous switching noise, a semiconductor device on which the bus converter is mounted, and a method of reducing simultaneous switching noise of the bus converter and the semiconductor device on which the bus converter is mounted, in a manner so as not to arrange a buffer for generating a time difference between signals and not to change the electrical characteristics of a buffer.

According to one aspect of the present invention, there is provided a bus converter that converts a signal of a synchronous bus into a signal of an asynchronous bus. The bus converter comprises a control signal generation unit that generates n control signals synchronized at different timings of a predetermined synchronization signal, where n is an integer of two or more; and an output unit that outputs the signal of the synchronous bus divided into n signal groups based on a control using the n control signals.

Preferably, the predetermined synchronization signal may be a synchronization signal of the synchronous bus.

Preferably, the predetermined synchronization signal may include plural synchronization signals including a first synchronization signal having a predetermined frequency and a second synchronization signal having a frequency higher than the frequency of the first synchronization signal.

Preferably, the predetermined synchronization signal may include plural synchronization signals including a first synchronization signal and a second synchronization signal having a phase inverted relative to a phase of the first synchronization signal.

Preferably, the bus converter described above may further comprise a multiplication unit that multiplies a frequency of a synchronization signal of the synchronous bus. The predetermined synchronization signal is a synchronization signal obtained by multiplying the frequency of the synchronization signal of the synchronous bus with the multiplication unit.

Preferably, the bus converter described above may further comprise a selection unit that selectively switches an output of the n signal groups between the output at a substantially same timing and the output at a different timing.

According to another aspect of the present invention, there is provided a semiconductor device comprising a substrate; and the bus converter described above mounted on the substrate.

Preferably, an address signal or a data signal allocated to a mutually adjacent wiring pattern and included in the signal of the synchronous bus may be set to be in a mutually different signal group.

Preferably, an address signal or a data signal allocated to a wiring pattern adjacent to another wiring pattern as a control signal included in the signal of the synchronous bus and included in the signal of the synchronous bus may be set to be in a signal group different from other signals included in the synchronous bus.

Preferably, parasitic capacitance that absorbs noise having a time difference between shifts of the n control signals as a cycle may be generated between wiring patterns of address signals and data signals allocated to mutually adjacent wiring patterns and included in the signal of the synchronous bus.

According to still another aspect of the present invention, there is provided a noise reduction method for reducing noise caused when a signal of a synchronous bus is converted into a signal of an asynchronous bus. The noise reduction method comprises the steps of generating n control signals synchronized at different timings of a predetermined synchronization signal, where n is an integer of two or more; and outputting the signal of the synchronous bus divided into n signal groups based on a control using the n control signals.

Preferably, the predetermined synchronization signal may be a synchronization signal of the synchronous bus.

Preferably, the predetermined synchronization signal may include plural synchronization signals containing a first synchronization signal having a predetermined frequency and a second synchronization signal having a frequency higher than the frequency of the first synchronization signal.

Preferably, the predetermined synchronization signal may include plural synchronization signals containing a first synchronization signal and a second synchronization signal having a phase inverted relative to a phase of the first synchronization signal.

Preferably, the predetermined synchronization signal may be a synchronization signal obtained by multiplying the frequency of the synchronization signal of the synchronous bus with a multiplication unit.

Preferably, the noise reduction method described above further comprises a step of selectively switching an output of the n signal groups between the output at a substantially same timing and the output at a different timing.

According to yet another aspect of the present invention, there is provided a semiconductor device that uses the noise reduction method described above.

Preferably, an address signal or a data signal allocated to a mutually adjacent wiring pattern and included in the signal of the synchronous bus may be set to be in a mutually different signal group.

Preferably, an address signal or a data signal allocated to a wiring pattern adjacent to another wiring pattern as a control signal included in the signal of the synchronous bus and included in the signal of the synchronous bus may be set to be in a signal group different from other signals included in the synchronous bus.

Preferably, parasitic capacitance that absorbs noise having a time difference between shifts of the n control signals as a cycle may be generated between wiring patterns of address signals and data signals allocated to mutually adjacent wiring patterns and included in the signal of the synchronous bus.

According to embodiments of the present invention, it is possible to provide a bus converter capable of reducing simultaneous switching noise, a semiconductor device on which the bus converter is mounted, and a method of reducing simultaneous switching noise of the bus converter and the semiconductor device on which the bus converter is mounted, in a manner so as not to arrange a buffer for generating a time difference between signals and not to change the electrical characteristics of a buffer.

Other objects, features and advantages of the present invention will become more apparent from the following detailed description when read in conjunction with the accompanying drawings.

BRIEF DESCRIPTION OF THE DRAWINGS

FIG. 1B is a diagram showing an example of a timing chart of the bus converter 3a according to the present invention in FIG. 1A;

FIG. 2B is a diagram showing an example of a timing chart of the conventional bus converter in FIG. 2A;

FIG. 2C is a diagram showing an example of a timing chart for explaining noise reduction in the bus converter 3a in FIG. 1A;

FIG. 3A is a diagram showing a configuration example of a bus signal control unit 300b of a bus converter 3b according to a second embodiment of the present invention;

FIG. 3B is a diagram showing an example of a timing chart when the second internal output control signal 22 is output from a selector 140 in the bus signal control unit 300b in FIG. 3A;

FIG. 3C is a diagram showing an example of a timing chart when the first internal output control signal 21 is output from the selector 140 in the bus signal control unit 300b in FIG. 3A;

FIG. 3D is a diagram showing an example of a timing chart when data transmission is performed by the bus converter 3a described in a first embodiment in FIG. 1A;

FIG. 4A is a diagram showing a configuration example of a bus signal control unit 300c in a bus converter 3c according to a third embodiment of the present invention;

FIG. 4B is a diagram showing an example of a timing chart of the bus signal control unit 300c in FIG. 4A:

FIG. 4C is a diagram showing an example of a timing chart of the bus conversion between a PCI bus and an XD-Card bus when the conventional bus converter 3z in FIG. 2A is used;

FIG. 4D is a diagram showing an example of a timing chart of the bus conversion between the PCI bus and the XD-Card bus when the bus converter 3a in FIG. 1A is used;

FIG. 4E is a diagram showing an example of a timing chart (set-up time extension) of the bus conversion between the PCI bus and the XD-Card bus when the bus converter 3a in FIG. 1A is used;

FIG. 5B is a diagram showing an example of a timing chart of the bus signal control unit 300d in FIG. 5A;

FIG. 6A is a diagram showing a configuration example of a bus signal control unit 300e in a bus converter 3e according to a fifth embodiment of the present invention;

FIG. 6B is a diagram showing an example of a timing chart of the bus signal control unit 300e in FIG. 6A;

FIG. 7A is a diagram showing a configuration example of a bus signal control unit 300f in a bus converter 3f according to a sixth embodiment of the present invention;

FIG. 7B is a diagram showing an example of a timing chart of a bus signal control unit 300f in FIG. 7A;

FIG. 8A is a diagram showing a configuration example of a bus signal control unit 300g in a bus converter 3g according to a seventh embodiment of the present invention;

FIG. 8B is a diagram showing an example of a timing chart of the bus signal control unit 300g in FIG. 8A;

FIG. 9B is a diagram showing an example of a timing chart of the bus signal control unit 300h in FIG. 9A;

FIG. 9C is a table showing an example of the terminal arrangement of a PC Card slot;

FIG. 10A is a diagram showing a configuration example of a bus signal control unit 300i in a bus converter 3i according to a ninth embodiment of the present invention;

FIG. 10B is a diagram showing an example of a timing chart of the bus signal control unit 300i in FIG. 10A;

FIG. 11A is a diagram showing a configuration example of a bus signal control unit 300j in a bus converter 3j according to a tenth embodiment of the present invention;

FIG. 11B is a diagram showing an example of a timing chart of the bus signal control unit 300j in FIG. 11A;

FIG. 12A is a diagram showing an example of a timing chart of the conventional bus converter 3z in FIG. 2A; and FIG. 12B is a diagram showing an example of a timing chart of the bus converter 3a in FIG. 1A.

DETAILED DESCRIPTION OF THE PREFERRED EMBODIMENTS

Referring to the accompanying drawings, a description is made of the best mode for carrying out the present invention.

First Embodiment

A first embodiment describes an example of a bus converter and a bus conversion method capable of reducing the simultaneous switching noise caused when data transmission is switched from a PCI bus that is a synchronous bus using PCICLK as a synchronization signal to a 16-bit PC Card that is an asynchronous bus having no synchronization signal.

For example, when the host of a system makes a request to write the data "0" to the address "0" of the 16-bit PC Card, a 16-bit PC Card Bridge as a bus converter generates an internal output control signal synchronized with PCICLK and then outputs the address "0" and the data "0" to an address bus and a data bus, respectively, at the change point of the internal output control signal.

The address bus consists of 26 bits and the data bus consists of 16 bits, and all the signals of the address bus and the data bus are set to the H-state by a pull-up resistor. Therefore, when a writing request to the address "0" and the data "0" is output, all the 42 signals of the address bus and the data bus are simultaneously shifted from the H-state to the L-state, thereby causing possible maximum simultaneous switching noise in the 16-bit PC Card. Due to the simultaneous switching noise thus caused, the state of other signals such as a write enable signal (hereinafter referred to as "WE#") that is an external output control signal may be shifted to another state (for example, from the H-state to the L-state). In this case, the 16-bit PC Card is caused to malfunction. In the following, a description is specifically made of this point referring to FIGS. 2A and 2B.

Figure 2A:
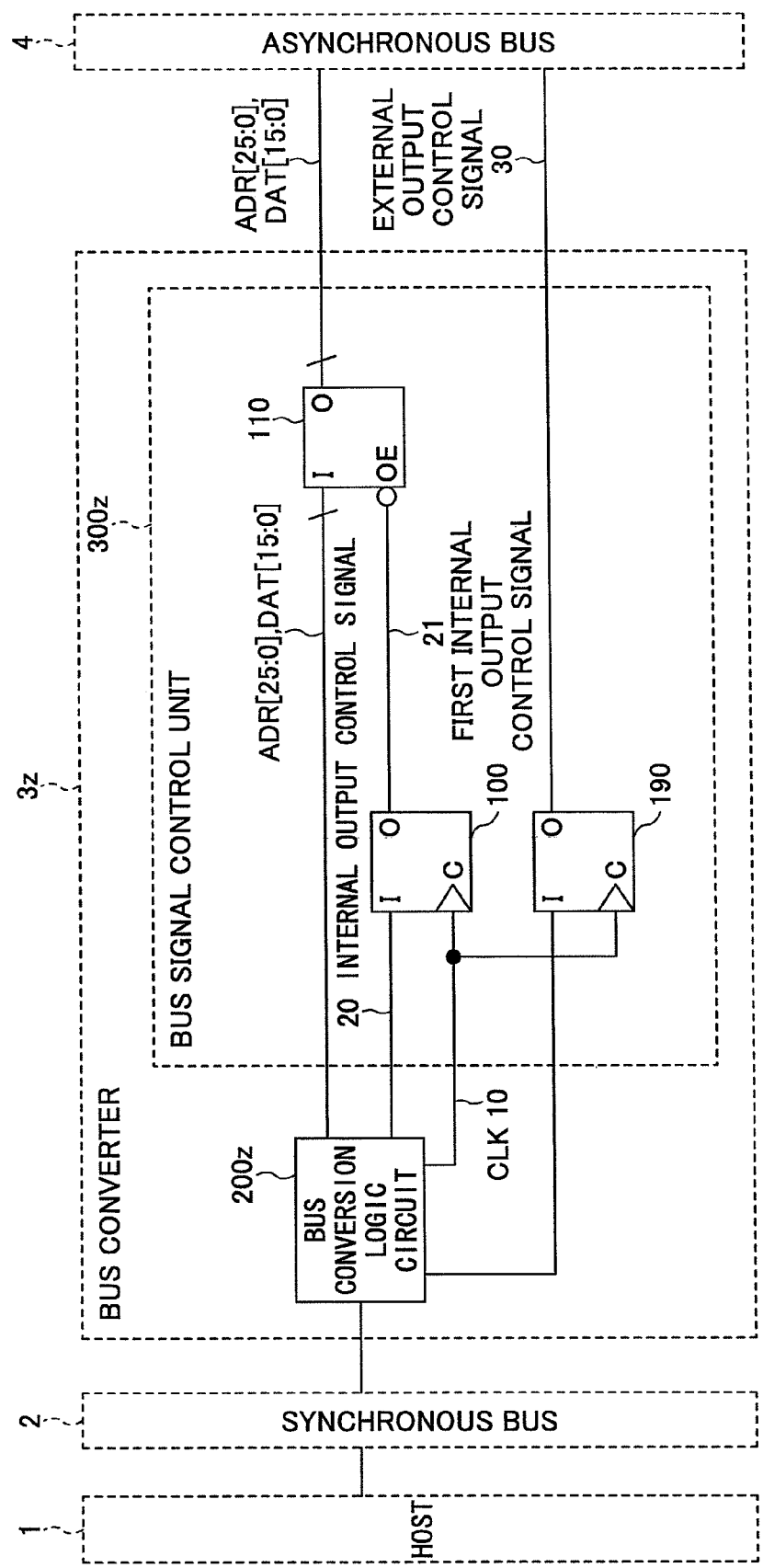
FIG. 2A is a diagram showing a configuration example of a conventional bus converter 3z.

FIG. 2A is a diagram showing a configuration example of a conventional bus converter 3z. FIG. 2B is a diagram showing an example of a timing chart of the conventional bus converter in FIG. 2A.

The bus converter 3z in FIG. 2A is connected to a synchronous bus 2 and an asynchronous bus 4 and converts the signal of the synchronous bus 2 into the signal of the asynchronous bus 4. The synchronous bus 2 is connected to a host 1.

The bus converter 3z in FIG. 2A is composed of a bus conversion logic circuit 200z and a bus signal control unit 300z. The bus signal control unit 300z is composed of a first control signal generation unit 100, a first output unit 110, and an external control signal generation unit 190. Note that the first control signal generation unit 100 and the external control signal generation unit 190 are, for example, flip-flop connected, and the first output unit 110 is, for example, an output buffer with an enable function.

When an internal output control signal 20 generated by the bus conversion logic circuit 200z is input to the I-terminal of the first control signal generation unit 100 according to the request from the host 1 in the bus signal control unit 300z of the bus converter 3z in FIG. 2A, a first internal output control signal 21 synchronized with a CLK 10 input from the bus conversion logic circuit 200z to the C-terminal is output from the O-terminal of the first control signal generation unit 100. The first internal output control signal 21 is input to the OE-terminal of the first output unit 110. All the 42 address and data signals output from the bus conversion logic circuit 200z are input to the I-terminal of the first output unit 110, and they are output from the O-terminal at the change point of the first internal output control signal 21. This status is shown in the timing chart in FIG. 2B.

Note, however, that the first output unit 110 is actually composed of m (m≧42) output units. The 42 address and data signals are input to the respective output units one by one and output from the O-terminals of the respective units at the change point of the first internal output control signal 21 input to the OE-terminals of the respective output units.

In the bus converter 3z in FIG. 2A, all the 42 address and data signals are shifted from the H-state to the L-state at the change point of the first internal output control signal 21. As a result, large simultaneous switching noise is caused. Assume that the voltage of an external output control signal 30 (WE#) drops from 3.3 V to 1.9 V by 1.4 V due to the simultaneous switching noise as shown in FIG. 2B. When the voltage of 2.2 V or higher is recognized as the H-state as in the TTL level, 1.9 V is not recognized as the H-state, but is recognized as the L-state. In this case, a malfunction in the system may be caused.

In the case of the synchronous bus, even if the states of other signals are shifted to another state due to simultaneous switching noise, there is no problem in data transmission provided that the simultaneous switching noise is suppressed until the next clock synchronization, thereby reducing the likelihood of causing a malfunction in the system. However, in the case of the asynchronous bus such as the 16-bit PC Card, if the state of the external output control signal such as WE# is shifted to the unintended state as described above, the function of the external output control signal becomes effective. As a result, there is a high likelihood of inducing a malfunction such as writing of unintended data to an unintended address.

Therefore, it is very important to reduce switching noise that affects the external output control signal of the asynchronous bus.

In the above example, all the 42 address and data signals are controlled by the single internal output control signal (the first internal output control signal 21 in FIGS. 2A and 2B). Therefore, all the 42 address and data signals are simultaneously shifted at the change point of the first internal output control signal 21 as the single internal output control signal. As a result, large switching noise is caused. In order to solve this problem, if plural internal output control signals are generated at different synchronization timings and address and data signals are each allocated to the plural internal output control signals, it is possible to reduce simultaneous switching noise. A description is specifically made of this point referring to FIGS. 1A, 1B, and 2C.

Figure 1A:
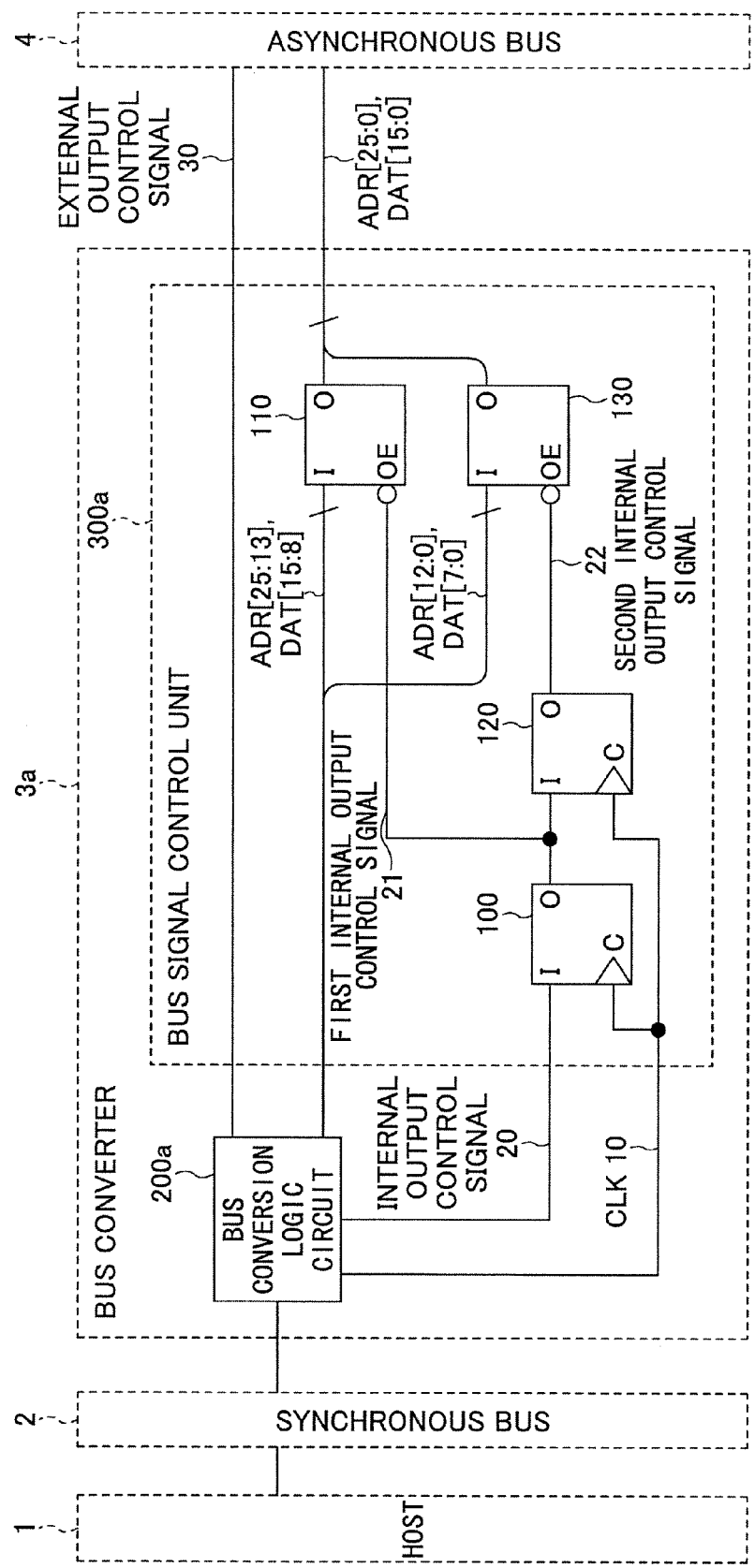
FIG. 1A is a diagram showing a configuration example of a synchronous/asynchronous bus converter 3a having a function of outputting a bus signal with a time difference according to an embodiment of the present invention.

FIG. 1A is a diagram showing a configuration example of a synchronous/asynchronous bus converter 3a having a function of outputting a bus signal with a time difference according to an embodiment of the present invention (hereinafter, simply referred to as a bus converter according to the present invention). FIG. 1B is a diagram showing an example of a timing chart of the bus converter 3a according to the present invention in FIG. 1A.

The bus converter 3a in FIG. 1A is connected to the synchronous bus 2 and the asynchronous bus 4 and converts the signal of the synchronous bus 2 into the signal of the asynchronous bus 4. The synchronous bus 2 is connected to the host 1.

The bus converter 3a in FIG. 1A is composed of a bus conversion logic circuit 200a and a bus signal control unit 300a. The bus signal control unit 300a is composed of the first control signal generation unit 100, the second control signal generation unit 120, the first output unit 110, and the second output unit 130. The external output control signal 30 is output from the bus conversion logic circuit 200a to the asynchronous bus 4. As the CLK 10, a clock of the synchronous bus 2 may be output as it is after passing through the bus conversion logic circuit 200 or may be output after being subjected to PLL processing in the bus conversion logic circuit 200a. Alternatively, it may be supplied from the outside.

When the internal output control signal 20 generated by the bus conversion logic circuit 200a is input to the I-terminal of the first control signal generation unit 100 according to the request from the host 1 in the bus signal control unit 300a of the bus converter 3a in FIG. 1A, the first internal output control signal 21 synchronized with the CLK 10 as a synchronization signal input from the bus conversion logic circuit 200a to the C-terminal is output from the O-terminal of the first control signal generation unit 100. The first internal output control signal 21 is input to the I-terminal of the second control signal generation unit 120 and the OE-terminal of the first output unit 110. From the O-terminal of the second control signal generation unit 120, a second internal output control signal 22, synchronized with the clock synchronization timing of the CLK 10 input to the C-terminal following the timing at which the first internal output control signal is generated, is output. The second internal output control signal 22 is input to the OE-terminal of the second output unit 130. The upper 21 address and data signals among the 42 address and data signals output from the bus conversion logic circuit 200a are input to the I-terminal of the first output unit 110. Those signals are output from the O-terminal of the first output unit 110 at the change point of the first internal output control signal 21 input to the OE-terminal. Furthermore, the lower 21 address and data signals among the 42 address and data signals output from the bus conversion logic circuit 200a are input to the I-terminal of the second output unit 130. Those signals are output from the O-terminal of the second output unit 130 at the change point of the second internal output control signal 22 input to the OE-terminal. This status is shown in the timing chart in FIG. 1B.

Note, however, that the first output unit 110 and the second output unit 130 are actually composed of m (m≧42) output units. The 42 address and data signals are input to the respective output units one by one and output from the O-terminals of the respective units at the change point of the first internal output control signal 21 or the second internal output control signal 22 input to the OE-terminals of the respective output units.

In the bus converter 3a in FIG. 1A, the first internal output control signal 21 is generated in synchronization with the CLK 10 as the synchronization signal, and the second internal output control signal 22 is generated in synchronization with the next synchronization timing of the CLK 10 as shown in the timing chart in FIG. 1B. The CLK 10 as the synchronization signal may be, for example, the synchronization signal itself of the synchronous bus 2. For example, if the CLK 10 as the synchronization signal is the synchronization signal of the synchronous bus, and, if the synchronous bus 2 is a PCI bus in which the frequency of the synchronization signal is 33 MHz, an approximately 30 ns time difference is generated between the change point of the first internal output control signal 21 and that of the second internal output control signal 22.

When the host 1 makes a request of writing to the address "0" and the data "0," the internal output control signal 20 generated by the bus logic circuit 200a is input to the first control signal generation unit 100 of the bus signal control unit 300a. Then, the upper 21 address and data signals among the 42 address and data signals output from the bus conversion logic circuit 200a are simultaneously shifted from the H-state to the L-state at the change point of the first internal output control signal 21 generated by the first control signal generation unit 100. When an approximately 30 ns elapses after the state of the upper 21 address and data signals is shifted, the lower 21 address and data signals among the 42 address and data signals output from the bus conversion logic circuit 200a are simultaneously shifted from the H-state to the L-state at the change point of the second internal output control signal 22 generated by the second control signal generation unit 120. Compared with the case in FIGS. 2A and 2B where all the 42 address and data signals are controlled by the single internal output control signal (the first internal output control signal 21 in FIGS. 2A and 2B), only half the simultaneous switching noise is caused at a certain timing in this case. At the next timing also, only half the simultaneous switching noise is caused.

As described above, the 42 address and data signals are divided into two signal groups. That is, the upper 21 address and data signals (a first signal group) among the 42 address and data signals are allocated to the first internal output control signal 21, whereas the lower 21 address and data signals (a second signal group) are allocated to the second internal output control signal 22. Moreover, the first internal output control signal 21 and the second internal output control signal 22 are generated so as to be synchronized at different timings of the CLK 10 as a predetermined synchronization signal, whereby an approximately 30 ns time difference is generated between the change point of the first internal output control signal 21 and that of the second internal output control signal 22. Accordingly, it is possible to reduce the energy density of simultaneous switching noise (although the total amount of energy is not varied), thereby reducing the simultaneous switching noise. As a result, the bus converter 3a largely reduces the likelihood of shifting the state of other signals such as WE# as the external output control signal 30 to another state (for example, from the H-state to the L-state), thereby making it possible to prevent a malfunction in the system.

FIG. 2C is a diagram showing an example of a timing chart for explaining noise reduction in the bus converter 3a in FIG. 1A.

Assume that the simultaneous switching noise is reduced in a case where maximum 21 address and data signals are simultaneously shifted as in the bus converter 3a according to the present invention in FIG. 1A. Compared with the case of the conventional bus converter 3z in FIG. 2A, the voltage of the external output control signal 30 (WE#) drops from 3.3 V to 2.6 V by 0.7 V difference as shown in FIG. 2C, the lowest voltage where voltage drop is simply 0.7 V, or half the size of 1.4 V. However, when the voltage of 2.2 V or higher is recognized as the H-state as in the TTL level, the voltage 2.6 V at the time of the voltage drop exceeds 2.2 V at which the H-state is recognized. Therefore, the H-state is always recognized in this case, thereby preventing a malfunction in the system.

The first embodiment described above refers to the case where the simultaneous switching noise is reduced when the address and data signals are shifted from the H-state to the L-state, but the same effect is achieved also when the address and data signals are shifted from the L-state to the H-state. Furthermore, the first embodiment refers to the case where the two internal output control signals (the first internal output control signal 22 and the second internal output control signal 23) to which the address and data signals are allocated are generated from the internal output control signal 20 so as to the reduce simultaneous switching noise. Besides, three or more internal output control signals to which the address and data signals are allocated may be generated.

Note that if the timing (the fall time in FIG. 1B) at the change point of the second internal output control signal 22 is set as the timing at which the address and data signals are determined and defined to be a reference value, it is possible to meet the output timing of the external output control signal 30 provided in a specification (as described in a second embodiment).

Second Embodiment

As described in the first embodiment, the output timing of the external output control signal 30 is specified according to the time after the change point of the second internal output control signal 22. Compared with a case when data transmission is performed by the conventional bus converter 3z in FIG. 2A, a delay corresponding to the time difference between the change point of the first internal output control signal 21 and that of the second internal output control signal 22 is generated when the data transmission is performed by the bus converter 3a described in the first embodiment in FIG. 1A. Therefore, in the case of the bus converter 3a, a data transmission amount per unit time is reduced.

Figure 3E:
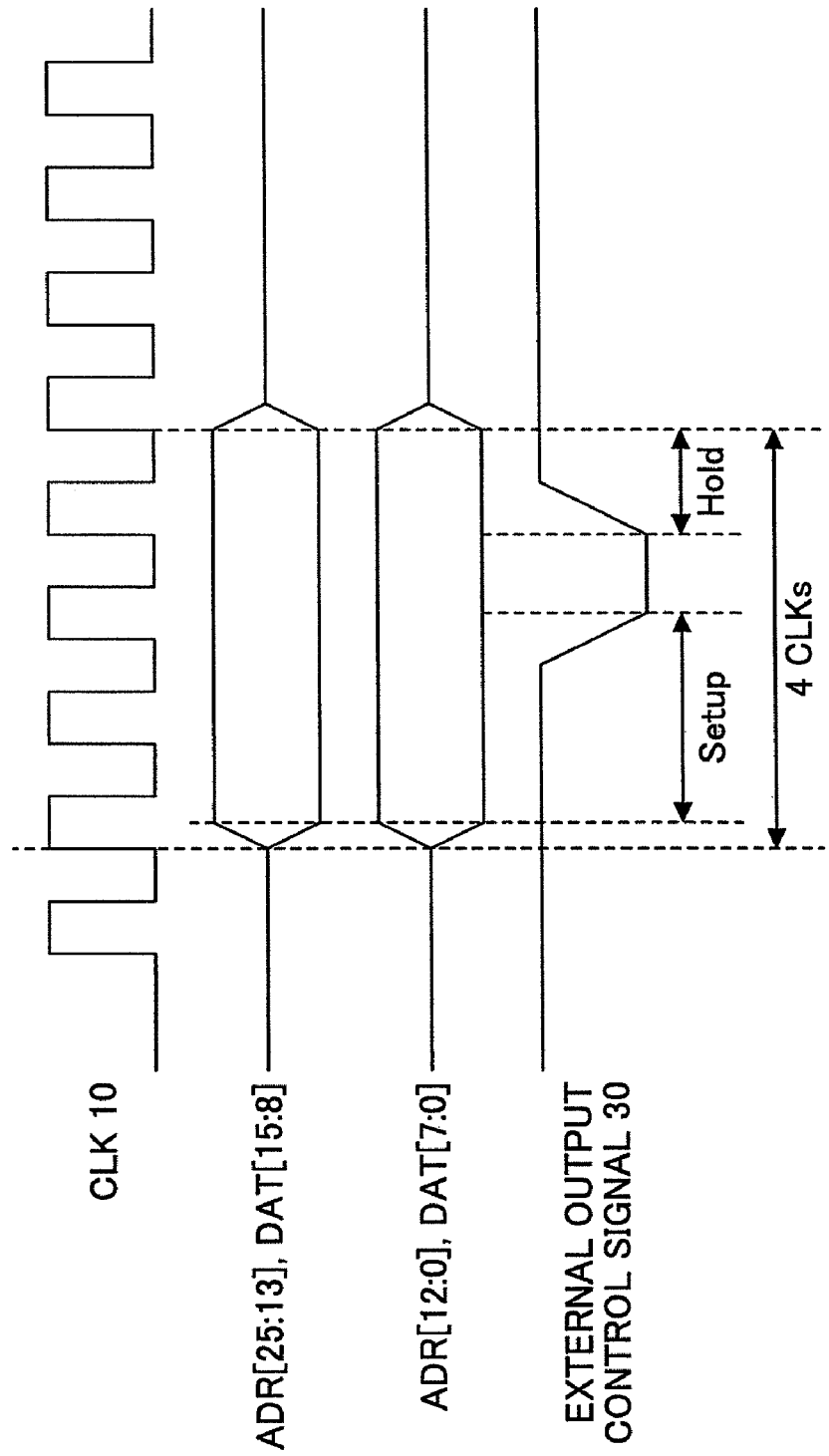
FIG. 3E is a diagram showing an example of a timing chart when data transmission is performed by the conventional bus converter 3z in FIG. 2A.

For example, FIG. 3E is a diagram showing an example of a timing chart when data transmission is performed by the conventional bus converter 3z in FIG. 2A. In the case of a conventional data transmission method using such a conventional bus converter, four clock cycles consisting of two clock cycles for set-up, one clock cycle for an external output control signal pulse width, and one clock cycle for hold are required for completing the data transmission. On the other hand, FIG. 3D is a diagram showing an example of a timing chart when data transmission is performed by the bus converter 3a described in the first embodiment in FIG. 1A. In the case of a data transmission method according to the first embodiment of the present invention, two extra clock cycles consisting of one clock cycle for starting data transmission and one clock cycle for completing the data transmission are required so that the set-up time and the hold time follow the specifications (set-up time≧two clock cycles and hold time≧one clock cycle). That is, this method requires six clock cycles in total for data transmission.

In view of this, if the conventional data transmission method and the data transmission method according to the first embodiment of the present invention are capable of being switched to each other, it is possible to perform data transmission at the same timing as the conventional data transmission method in a case where it is determined that the simultaneous switching noise is insignificant even in the conventional data transmission method. In the following, a description is made of operations of a bus converter 3b according to the present invention in FIG. 3A.

FIG. 3A is a diagram showing a configuration example of a bus signal control unit 300b of the bus converter 3b according to the second embodiment of the present invention. The bus converter 3b (not shown) according to the second embodiment is connected to the synchronous bus 2 and the asynchronous bus 4 as in the bus converter 3a in FIG. 1A and converts the signal of the synchronous bus 2 into the signal of the asynchronous bus 4. The bus converter 3b is composed of a bus conversion logic circuit 200b and a bus signal control unit 300b, but it has the same configuration as the bus converter 3a in FIG. 1A except for the bus signal control unit 300b. Therefore, only the bus signal control unit 300b is shown in FIG. 3A. In FIG. 3A, parts the same as or similar to those in FIG. 1A are given the same reference numerals and a description thereof is omitted. The bus signal control unit 300b in FIG. 3A is different from the bus signal control unit 300a in FIG. 1A in that it additionally has a selector 140 as a selection unit.

In the bus signal control unit 300b in FIG. 3A, the first internal output control signal 21 is input to the I1-terminal of the selector 140 and the second internal output control signal 22 is input to the I2-terminal thereof. Furthermore, a selection signal 40 output from the bus conversion logic circuit 200b (not shown) is input to the SEL-terminal of the selector 140. For example, when the selection signal is in the H-state, the first internal output control signal 21 is output from the O-terminal of the selector 140. When the selection signal is in the L-state, the second internal output control signal 22 is output from the O-terminal of the selector 140.

FIG. 3C is a diagram showing an example of a timing chart when the first internal output control signal 21 is output from the selector 140 in the bus signal control unit 300b in FIG. 3A. If the simultaneous switching noise is insignificant, the selection signal 40 in the H-state is input to the SEL-terminal of the selector 140 and the first internal output control signal 21 is output from the O-terminal of the selector 140, thereby performing the data transmission as shown in FIG. 3C. Accordingly, it is possible to maintain the same data transmission amount per unit time as the conventional data transmission method.

FIG. 3B is a diagram showing an example of a timing chart when the second internal output control signal 22 is output from the selector 140 in the bus signal control unit 300b in FIG. 3A. If the simultaneous switching noise is significant, the selection signal 40 in the L-state is input to the SEL-terminal of the selector 140 and the second internal output control signal 22 is output from the O-terminal of the selector 140, thereby performing the data transmission as shown in FIG. 3B. Accordingly, it is possible to reduce the simultaneous switching noise as in the first embodiment.

As described above, according to the bus converter 3b of the second embodiment, it is possible to select whether the lower 21 address and data signals output from the bus conversion logic circuit 200b are to be output at either the change point of the first internal output control signal 21 or that of the second internal output control signal 22. In other words, it is possible to select the presence or absence of the time difference between the shift of the upper 21 address and data signals and that of the lower 21 address and data signals. As a result, when the simultaneous switching noise is not caused, it is possible to prevent the reduction of a data transmission amount per unit time.

With the configuration of the bus signal control unit 300b in FIG. 3A constituting the bus converter 3b according to the second embodiment, a small amount of delay is generated between the shift of the upper 21 address and data signals and that of the lower 21 address and data signals even if the selection signal 40 in the H-state is input to the selector 140 and the first internal output control signal 21 is selected (see FIG. 3C). This is because only the first internal output control signal 21, which is output from the O-terminal of the selector 140 and shifts the lower 21 address and data signals, passes through the selector 140. Thus, a delay corresponding to the time during which the signal passes from the input to the output of the selector 140 is generated.

Figure 3F:
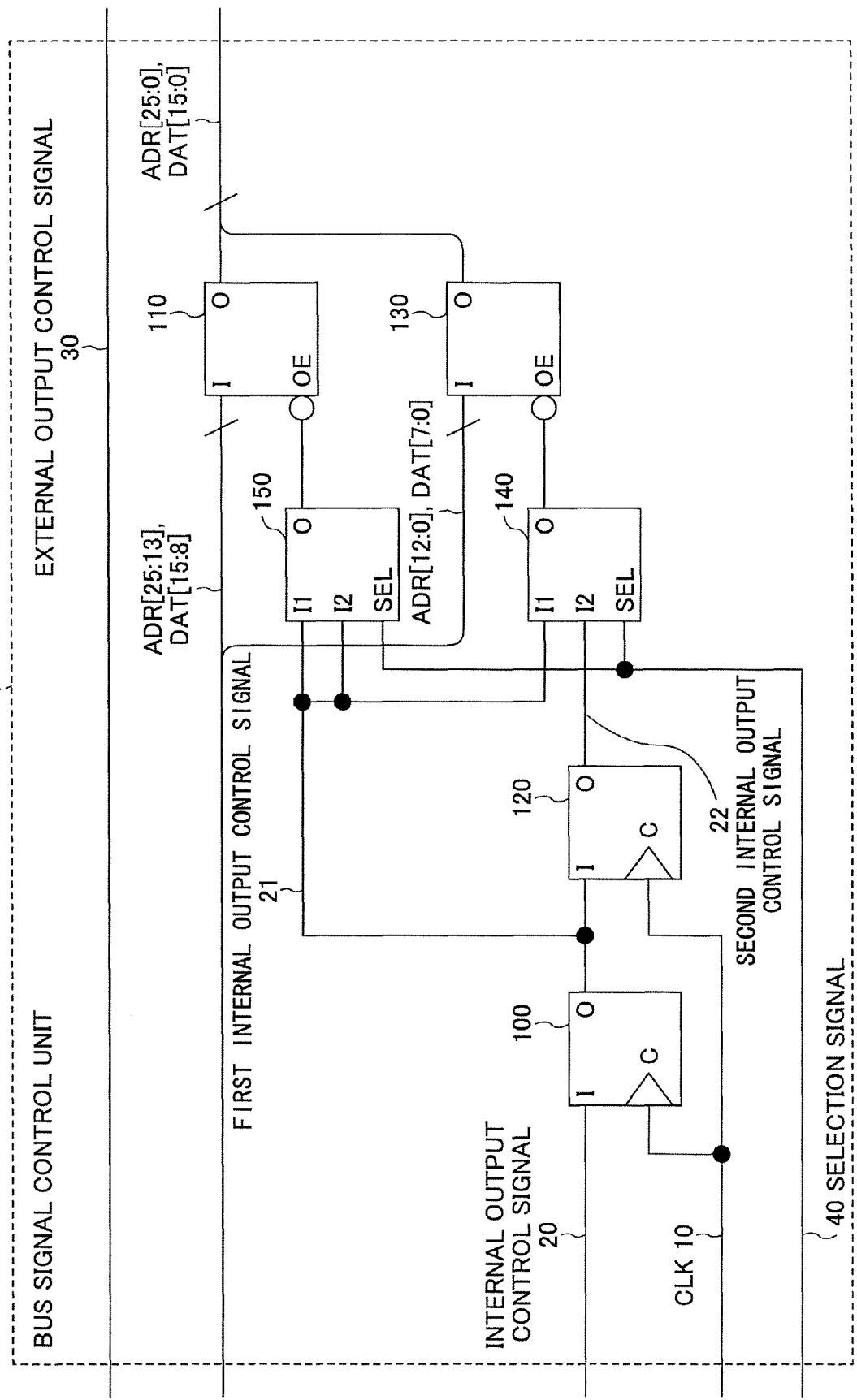
FIG. 3F is a diagram showing a configuration example of a bus signal control unit 300b' in a bus converter 300b' that prevents the generation of the delay between the shifts of address and data signals.

FIG. 3F is a diagram showing a configuration example of a bus signal control unit 300b' in a bus converter 300b' that prevents the generation of the delay between the shifts of address and data signals. The bus converter 3b' (not shown) is connected to the synchronous bus 2 and the asynchronous bus 4 as in the bus converter 3a in FIG. 1A and converts the signal of the synchronous bus 2 into the signal of the asynchronous bus 4. The bus converter 3b' is composed of a bus conversion logic circuit 200b' and a bus signal control unit 300b', but it has the same configuration as the bus converter 3a in FIG. 1A except for the bus signal control unit 300b'. Therefore, only the bus signal control unit 300b' is shown in FIG. 3F. In FIG. 3F, parts the same as or similar to those in FIG. 1A are given the same reference numerals and a description thereof is omitted. The bus signal control unit 300b' in FIG. 3F is different from the bus signal control unit 300a in FIG. 1A in that it additionally has the selector 140 and a selector 150 as a selection unit. Furthermore, the bus signal control unit 300b' in FIG. 3F is different from the bus signal control unit 300b in FIG. 3A in that it additionally has the selector 150.

As shown in FIG. 3F, the selector 150 is added to the bus signal control unit 300b', the first internal output control signal 21 is input to the I1-terminal and the I2-terminal of the selector 150, and the output of the O-terminal of the selector 150 is input to the OE-terminal of the output unit 110. With this configuration, it is possible to prevent the generation of the delay between the shift of the upper 21 address and data signals and that of the lower 21 address and data signals.

Third Embodiment

In the case of the configuration of the bus converter 3a according to the first embodiment in FIG. 1A, the first internal output control signal 21 is generated at certain clock synchronization timing of the CLK 10, and the second internal output control signal 22 is generated at the next clock synchronization timing. Therefore, in the case of the PCI bus in which the frequency of a synchronization signal is 33 MHz, an approximately 30 ns time difference is generated between the change point of the first internal output control signal 21 and that of the second internal output control signal 22. In this case, as described in the second embodiment comparing the timing chart in FIG. 3D with that in FIG. 3E, the approximately 30 ns time difference is generated both at the time of starting and stopping the outputs of the address and data signals. Therefore, an approximately 60 ns delay in total is generated per transaction.

A third embodiment proposes a method of reducing this delay time.

FIG. 4A is a diagram showing a configuration example of a bus signal control unit 300c in a bus converter 3c according to the third embodiment of the present invention. The bus converter 3c (not shown) according to the third embodiment is connected to the synchronous bus 2 and the asynchronous bus 4 as in the bus converter 3a in FIG. 1A and converts the signal of the synchronous bus 2 into the signal of the asynchronous bus 4. The bus converter 3c is composed of a bus conversion logic circuit 200c and a bus signal control unit 300c, but it has the same configuration as the bus converter 3a in FIG. 1A except for the bus signal control unit 300c. Therefore, only the bus signal control unit 300c is shown in FIG. 4A. In FIG. 4A, parts the same as or similar to those in FIG. 1A are given the same reference numerals and a description thereof is omitted. The bus signal control unit 300c in FIG. 4A is different from the bus signal control unit 300a in FIG. 1A in that a CLK 11 obtained by inverting the phase of the CLK 10 via an inverter 160 is input to the C-terminal of the second control signal generation unit 120.

FIG. 4B is a diagram showing an example of a timing chart of the bus signal control unit 300c in FIG. 4A. As shown in FIG. 4B, the first internal output control signal 21 is changed in synchronization with the rise time of the CLK 10, and the second internal output control signal 22 is changed in synchronization with the rise time of the CLK 11 (the fall time of the CLK 10).

Accordingly, when the cycle of the CLK 10 is approximately 30 ns, a 15 ns time difference is generated both at the time of starting and at the time of stopping the outputs of the address and data signals. As a result, a time difference per transaction is 30 ns in total. Therefore, compared with the first embodiment, it is possible to reduce (reduce by half) the generation of the delay and prevent the reduction of a data transmission amount per unit time.

Furthermore, in the same manner as with the case of configuring the bus signal control unit 300b of the bus converter 3b in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300c in FIG. 4A constituting the bus converter 3c according to the third embodiment.

Furthermore, the bus converter may be configured such that the first internal output control signal 21 of the bus signal control unit 300c in FIG. 4A, the second internal output control signal 22 of the bus signal control unit 300a according to the first embodiment in FIG. 1A, and the second internal output control signal 22 of the bus signal control unit 300c in FIG. 4A are input to three input terminals of a selector provided as the selector 140, respectively, so as to select the presence or absence between the outputs of the address and data signals and the size of the time difference. In this case, the presence or absence between the outputs of the address and data signals and the size of the time difference may be selected, for example, by the use of two selection signals.

Here, a description is made of an example in which the bus converter 3c according to the third embodiment is used for the bus conversion between a PCI bus and an XD-Card bus. FIG. 4C is a diagram showing an example of a timing chart of the bus conversion between the PCI bus and the XD-Card bus when the conventional bus converter 3z in FIG. 2A is used. The PCI bus is the synchronous bus using PCICLK as a synchronization signal, and the XD-Card bus is the asynchronous bus having no synchronization signal. When the host of a system makes a request of writing data to the XD-Card bus, a 30 ns (specification value) set-up time and a 20 ns (specification value) hold time are required with respect to the WE# signal as the external output control signal on the XD-Card bus. In order to meet the specification values of the set-up time and the hold time with the PCICLK (30 ns cycle), a 60 ns set-up time (Setup1) for two cycles and a 30 ns hold time (Hold1) for one cycle are required.

FIG. 4D is a diagram showing an example of a timing chart of the bus conversion between the PCI bus and the XD-Card bus when the bus converter 3a in FIG. 1A is used. As in the bus converter 3a according to the first embodiment in FIG. 1A, the upper 21 address and data signals are allocated to the first internal output control signal 21, whereas the lower 21 address and data signals are allocated to the second internal output control signal 22. In addition, the approximately 30 ns time difference is generated between the change point of the first internal output control signal 21 and that of the second internal output control signal 22. In this case, a 60 ns set-up time (Setup1) and a 30 ns hold time (Hold1) are provided by the first internal output control signal 21 for the upper 21 address and data signals, and a 30 ns set-up time (Setup2) and a 60 ns hold time (Hold2) are provided by the second internal output control signal 22 for the lower 21 address and data signals. At this time, if the set-up time (Setup2) for the lower 21 address and data signals is 30 ns, it becomes equivalent to the specification value. Accordingly, the specification value may not be met.

In order to deal with this, it is necessary to extend the set-up time by one PCI clock cycle (approximately 30 ns). FIG. 4E is a diagram showing an example of a timing chart (set-up time extension) of the bus conversion between the PCI bus and the XD-Card bus when the bus converter 3a in FIG. 1A is used. As shown in FIG. 4E, a 90 ns set-up time (Setup1) and a 30 ns hold time (Hold1) are provided by the first internal output control signal 21 for the upper 21 address and data signals, and a 60 ns set-up time (Setup2) and a 60 ns hold time (Hold2) are provided by the second internal output control signal 22 for the lower 21 address and data signals. In other words, because a transfer time is increased by 30 ns per data transmission, a data transmission amount per unit time is reduced.

Figure 4F:
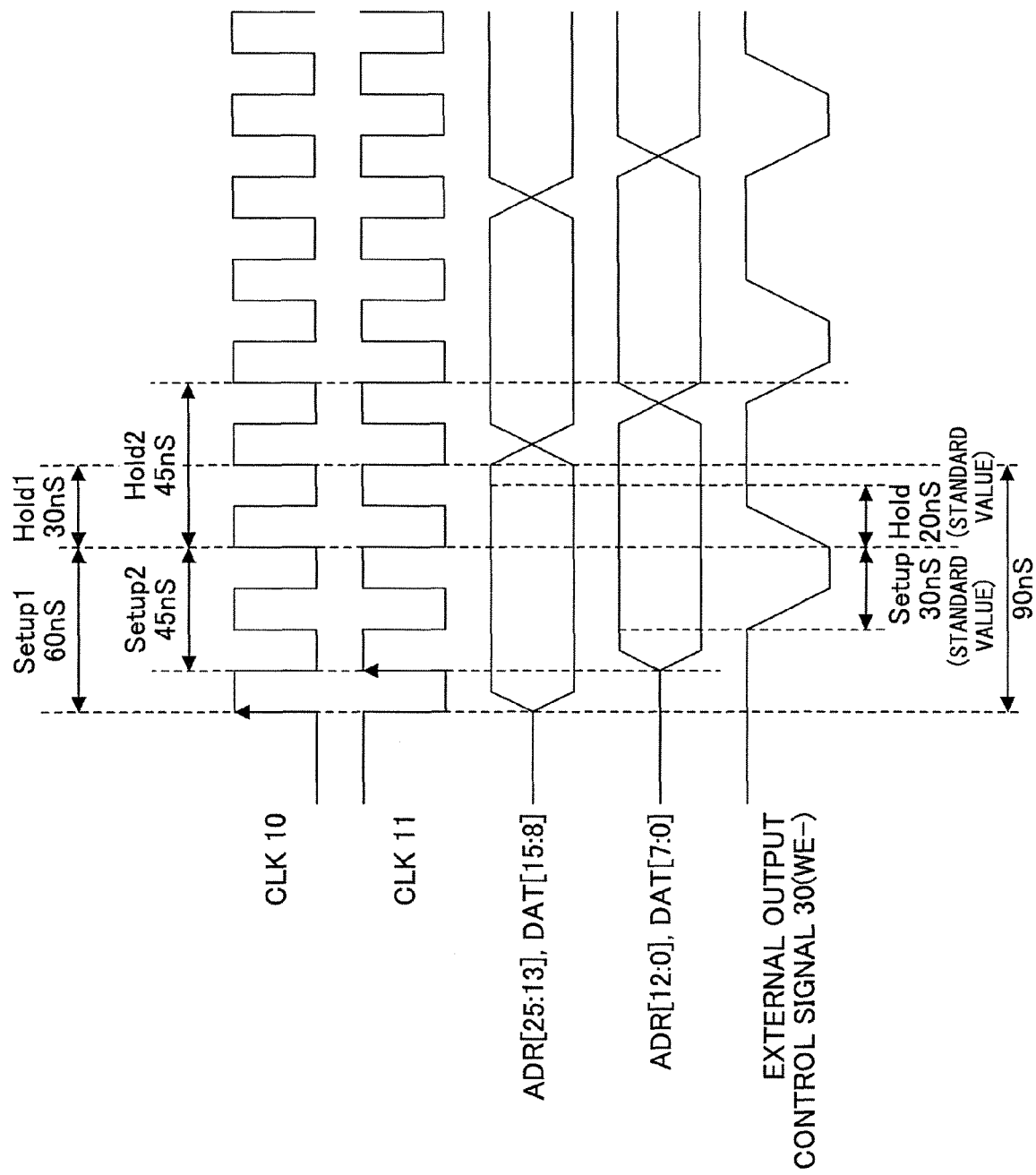
FIG. 4F is a diagram showing an example of a timing chart of the bus conversion between the PCI bus and the XD-Card bus when the bus converter 3c according to the third embodiment is used.

FIG. 4F is a diagram showing an example of a timing chart of the bus conversion between the PCI bus and the XD-Card bus when the bus converter 3c according to the third embodiment is used. When the bus converter 3c according to the third embodiment is used, the first internal output control signal 21 is shifted in synchronization with the rise time of the CLK 10, and the second internal output control signal 22 is shifted in synchronization with the rise time of the CLK 11 (the fall time of the CLK 10). Therefore, an approximately 15 ns time difference is generated between the first internal output control signal 21 and the second internal output control signal 22. In this case, a 60 ns set-up time (Setup1) and a 30 ns hold time (Hold1) are provided by the first internal output control signal for the upper 21 address and data signals, and a 45 ns set-up time (Setup2) and a 45 ns hold time (Hold2) are provided by the second internal output control signal 22 for the lower 21 address and data signals. In this case, as shown in FIG. 4F, the 45 ns set-up time (Setup2) for the lower 21 address and data signals is a value sufficiently larger than the specification value of 30 ns. Accordingly, it is possible to sufficiently meet the specification value and prevent the reduction of a data transmission amount per unit time without increasing the transfer time by 30 ns per data transmission as in the case of using the bus converter 3a according to the first embodiment in FIG. 4E.

Fourth Embodiment

In the case of the configuration of the bus converter 3a according to the first embodiment in FIG. 1A, the first internal output control signal 21 is generated at a certain clock synchronization timing of the CLK 10, and the second internal output control signal 22 is generated at the next clock synchronization timing. Therefore, in the case of the PCI bus in which the frequency of a synchronization signal is 33 MHz, the approximately 30 ns time difference is generated between the change point of the first internal output control signal 21 and that of the second internal output control signal 22. In this case, as described in the second embodiment comparing the timing chart in FIG. 3D with that in FIG. 3E, the approximately 30 ns time difference is generated both at the time of starting and stopping the outputs of the address and data signals. Therefore, the approximately 60 ns delay in total is generated per transaction.

A fourth embodiment proposes a method of reducing this delay time in a manner different from the third embodiment.

Figure 5A:
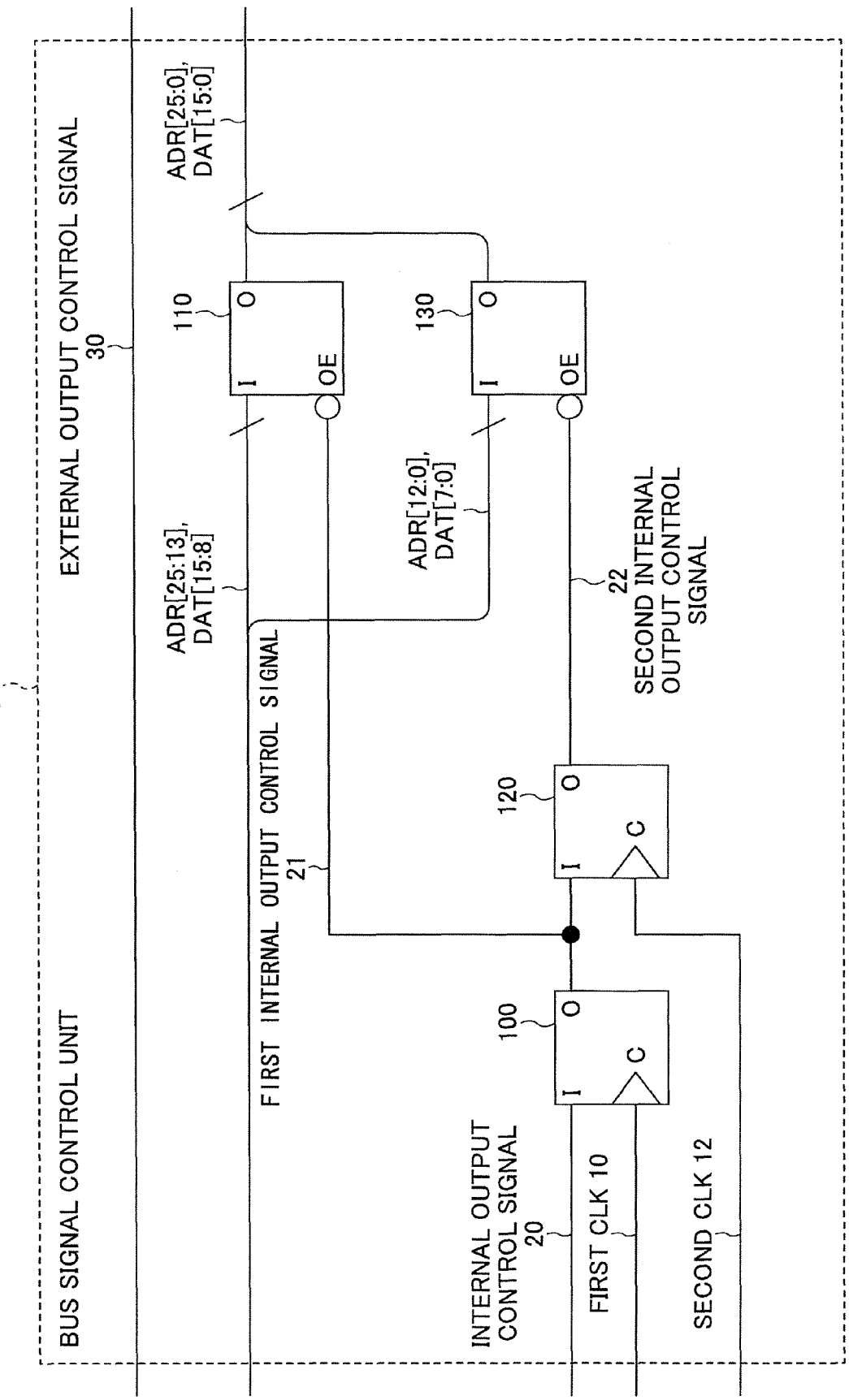
FIG. 5A is a diagram showing a configuration example of a bus signal control unit 300d in a bus converter 3d according to a fourth embodiment of the present invention.

FIG. 5A is a diagram showing a configuration example of a bus signal control unit 300d in a bus converter 3d according to the fourth embodiment of the present invention. The bus converter 3d (not shown) according to the fourth embodiment is connected to the synchronous bus 2 and the asynchronous bus 4 as in the bus converter 3a in FIG. 1A and converts the signal of the synchronous bus 2 into the signal of the asynchronous bus 4. The bus converter 3d is composed of a bus conversion logic circuit 200d and a bus signal control unit 300d, but it has the same configuration as the bus converter 3a in FIG. 1A except for the bus signal control unit 300d. Therefore, only the bus signal control unit 300d is shown in FIG. 5A. In FIG. 5A, parts the same as or similar to those in FIG. 1A are given the same reference numerals and a description thereof is omitted. The bus signal control unit 300d in FIG. 5A is different from the bus signal control unit 300a in FIG. 1A in that the first CLK 10 is input to the first control signal generation unit 100 and a second CLK 12 having a higher frequency than the first CLK 10 is input to the second control signal generation unit 120. Note that the CLK 12 may be generated after being subjected to PLL processing in the bus conversion logic circuit 200a based on the clock of the synchronous bus. Alternatively, it may be supplied from the outside of the bus converter 3d.

FIG. 5B is a diagram showing an example of a timing chart of the bus signal control unit 300d in FIG. 5A. As shown in FIG. 5B, the first internal output control signal 21 is changed in synchronization with the rise time of the first CLK 10, whereas the second internal output control signal 22 is changed in synchronization with the rise time of the CLK 12 having a higher frequency than the first CLK 10.

Accordingly, a 30 ns or smaller time difference is generated both at the time of starting and stopping the outputs of the address and data signals. Therefore, compared with the first embodiment, it is possible to reduce generation of delay and prevent reduction of data transmission amount per unit time.

Furthermore, in the same manner as with the case of configuring the bus signal control unit 300b of the bus converter 3b in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300d in FIG. 5A constituting the bus converter 3d according to the fourth embodiment. At this time, a clock obtained by inverting the second CLK 12 as in the third embodiment may be used as the clock of the second control signal generation unit 120.

Furthermore, the bus converter may be configured such that the first internal output control signal 21 of the bus signal control unit 300d in FIG. 5A, the second internal output control signal 22 of the bus signal control unit 300d in FIG. 5A, and the second internal output control signal 22 of the bus signal control unit 300a according to the first embodiment in FIG. 1A are input to the three input terminals of the selector provided as the selector 140, respectively, so as to select the presence or absence of the time difference between the outputs of the address and data signals and the size of the time difference. In this case, the presence or absence of the time difference of the outputs of the address and data signals and the size of the time difference may be selected, for example, by the use of two selection signals.

Fifth Embodiment

When the second CLK 12 having a higher frequency than the first CLK 10 is used to generate the second internal output control signal 22 so as to reduce the delay time as in the bus converter 3*d* in the fourth embodiment, the 30 ns or smaller time difference at the time of outputting the address and data signals is generated. However, the time difference does not become constant. Therefore, when the time difference is small, an effect of reducing the simultaneous switching noise is reduced.

According to a fifth embodiment, a multiplied synchronization signal is used to generate the first internal output control signal 21 and the second internal output control signal 22.

FIG. 6A is a diagram showing a configuration example of a bus signal control unit 300*e* in a bus converter 3*e* according to the fifth embodiment of the present invention. The bus converter 3*e* (not shown) according to the fifth embodiment is connected to the synchronous bus 2 and the asynchronous bus 4 as in the bus converter 3*a* in FIG. 1A and converts the signal of the synchronous bus 2 into the signal of the asynchronous bus 4. The bus converter 3*d* is composed of a bus conversion logic circuit 200*e* and a bus signal control unit 300*e*, but it has the same configuration as the bus converter 3*a* in FIG. 1A except for the bus signal control unit 300*e*. Therefore, only the bus signal control unit 300*e* is shown in FIG. 6A. In FIG. 6A, parts the same as or similar to those in FIG. 1A are given the same reference numerals and a description thereof is omitted. The bus signal control unit 300*e* in FIG. 6A is different from the bus signal control unit 300*a* in FIG. 1A in that a PLL circuit 170 as a multiplication unit is added to the bus signal control unit 300*e* and a CLK 13 obtained by multiplying the frequency of the CLK 10 as the clock of the synchronous bus through the PLL circuit 170 is used to generate the first internal output control signal 21 and the second internal output control signal 22. Note that it is not necessary to provide the PLL circuit 170 as the multiplication unit in the bus signal control unit 300*e*. The CLK 13 may be input to the bus signal control unit 300*e* from the PLL circuit 170 as the multiplication unit provided outside.

FIG. 6B is a diagram showing an example of a timing chart of the bus signal control unit 300*e* in FIG. 6A. As shown in FIG. 6B, the second internal output control signal 22 is determined at the next synchronization timing of the CLK 13 after the first internal output signal 21 has been determined. At this time, the time difference between the change point of the first internal output control signal 21 and that of the second internal output control signal 22 becomes equivalent to the cycle of the CLK 13 obtained by multiplying the frequency of the CLK 10 and becomes a constant value shorter than the cycle of the CLK 10.

As described above, the time difference between the change point of the first internal output control signal 21 and that of the second internal output control signal 22 becomes always constant. Therefore, unlike the fourth embodiment, it is possible to prevent increasing the simultaneous switching noise when the time difference between the change point of the first internal output control signal 21 and that of the second internal output control signal 22 is small. Furthermore, it is possible to prevent the reduction of a data transmission amount per unit time.

Furthermore, in the same manner as with the case of configuring the bus signal control unit 300*b* of the bus converter 3*b* in FIG. 3A, by adding the selector 140 to the bus signal control unit 300*a* of the bus converter 3*a* in FIG. 1A in the second embodiment, the presence or absence of the time difference between the outputs of the address and data signals may be selected by adding the selector 140 to the bus signal control unit 300*e* in FIG. 6A constituting the bus converter 3*e* according to the fifth embodiment. At this time, a clock obtained by inverting the CLK 13 obtained by multiplying the frequency of the CLK 10 through the PLL circuit 170 may be used as the clock of the second control signal generation unit 120.

Furthermore, the bus converter may be configured such that the first internal output control signal 21 of the bus signal control unit 300*e* in FIG. 6A, the second internal output control signal 22 of the bus signal control unit 300*e* in FIG. 6A, and the second internal output control signal 22 of the bus signal control unit 300*a* according to the first embodiment in FIG. 1A are input to the three input terminals of the selector provided as the selector 140, respectively, so as to select the presence or absence of the time difference between the outputs of the address and data signals and the size of the time difference. In this case, the presence or absence of the time difference between the outputs of the address and data signals and the size of the time difference may be selected, for example, by the use of two selection signals.

Sixth Embodiment

In the bus converter 3*a* according to the first embodiment in FIG. 1A, the upper 21 address and data signals among the 42 address and data signals are allocated to the first internal output control signal, whereas the lower 21 address and data signals thereamong are allocated to the second internal output control signal 22. According to a sixth embodiment, all the 16 data signals among the 42 address and data signals are allocated to the first internal output control signal 21, whereas all the 26 address signals are allocated to the second internal output control signal 22.

FIG. 7A is a diagram showing a configuration example of a bus signal control unit 300*f* in a bus converter 3*f* according to the sixth embodiment of the present invention. The bus converter 3*f* (not shown) according to the sixth embodiment is connected to the synchronous bus 2 and the asynchronous bus 4 as in the bus converter 3*a* in FIG. 1A and converts the signal of the synchronous bus 2 into the signal of the asynchronous bus 4. The bus converter 3*f* is composed of a bus conversion logic circuit 200*f* and a bus signal control unit 300*f*, but it has the same configuration as the bus converter 3*a* in FIG. 1A except for the bus signal control unit 300*f*. Therefore, only the bus signal control unit 300*f* is shown in FIG. 7A. In FIG. 7A, parts the same as or similar to those in FIG. 1A are given the same reference numerals and a description thereof is omitted. The bus signal control unit 300*f* in FIG. 7A is different from the bus signal control unit 300*a* in FIG. 1A in that all the 16 data signals are allocated to the first internal output control signal 21, whereas all the 26 address signals are allocated to the second internal output control signal 22.

FIG. 7B is a diagram showing an example of a timing chart of the bus signal control unit 300*f* in FIG. 7A. As shown in FIG. 7B, the address signals and the data signals are not simultaneously shifted. Therefore, it is possible to reduce the simultaneous switching noise.

Furthermore, in the same manner as with the case of configuring the bus signal control unit 300*b* of the bus converter 3*b* in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300f in FIG. 7A constituting the bus converter 300f according to the sixth embodiment. At this time, the CLK 13 obtained by multiplying the frequency of the CLK 10 through the PLL circuit 170 may be used as the clock of the first control signal generation unit 100 and the second control signal generation unit 120. Alternatively, as the clock of the second control signal generation unit 120, a clock obtained by inverting the CLK 13 obtained by multiplying the frequency of the CLK 10 through the PLL circuit 170 or a clock obtained by inverting the CLK 10 may be used.

Furthermore, the bus converter may be configured such that the first internal output control signal 21 of the bus signal control unit 300f in FIG. 7A, the second internal output control signal 22 of the bus signal control unit 300f in FIG. 7A, and any one of the second internal output control signal 22 of the bus signal control unit 300c in FIG. 4A, the second internal output control signal 22 of the bus signal control unit 300d in FIG. 5A, and the second internal output control signal 22 of the bus signal control unit 300e in FIG. 6A are input to the three input terminals of the selector provided as the selector 140, respectively, so as to select the presence or absence of the time difference between the outputs of the address and data signals and the size of the time difference. In this case, the presence or absence of the time difference between the outputs of the address and data signals and the size of the time difference may be selected, for example, by the use of two selection signals.

Seventh Embodiment

When the address signals or the data signals, which are sequentially arranged, are shifted in the bus converter 3f according to the sixth embodiment, the simultaneous switching noise is locally generated in the vicinity of the address signals or the data signals. Here, the locally-generated simultaneous switching noise refers to the simultaneous switching noise generated at an area having a high noise density on a substrate. In other words, in a case where the address signals or the data signals are sequentially arranged on the substrate when the bus converter is mounted on the substrate, the number of signals that simultaneously switch becomes large in a unit area of the substrate, resulting in a high noise density. In this case, the simultaneous switching noise generated at the area having the high noise density becomes problematic (because it causes a large noise source). Accordingly, such a noise is called the locally-generated simultaneous switching noise.

According to a seventh embodiment, odd-numbered terminals of the address and data signals among the address and data signals are allocated to the first internal output control signal 21, whereas even-numbered terminals of the address and data signals thereamong are allocated to the second internal output control signal 22.

FIG. 8A is a diagram showing a configuration example of a bus signal control unit 300g in a bus converter 3g according to the seventh embodiment of the present invention. The bus converter 3g (not shown) according to the seventh embodiment is connected to the synchronous bus 2 and the asynchronous bus 4 as in the bus converter 3a in FIG. 1A and converts the signal of the synchronous bus 2 into the signal of the asynchronous bus 4. The bus converter 3g is composed of a bus conversion logic circuit 200g and a bus signal control unit 300g, but it has the same configuration as the bus converter 3a in FIG. 1A except for the bus signal control unit 300g. Therefore, only the bus signal control unit 300g is shown in FIG. 8A. In FIG. 8A, parts the same as or similar to those in FIG. 1A are given the same reference numerals and a description thereof is omitted. The bus signal control unit 300g in FIG. 8A is different from the bus signal control unit 300a in FIG. 1A in that the odd-numbered terminals ADR (ODD) and DAT (ODD) of the address and data signals among the address and data signals are allocated to the first internal output control signal 21, whereas the even-numbered terminals ADR (EVEN) and DAT (EVEN) of the address and data signals thereamong are allocated to the second internal output control signal 22.

FIG. 8B is a diagram showing an example of a timing chart of the bus signal control unit 300g in FIG. 8A. As shown in FIG. 8B, all the address signals or the data signals are not simultaneously shifted. Therefore, when the address signals or the data signals are sequentially arranged, it is possible to prevent the simultaneous switching noise from being locally generated.

Furthermore, in the same manner as with the case of configuring the bus signal control unit 300b of the bus converter 3b in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300g in FIG. 8A constituting the bus converter 3g according to the seventh embodiment. At this time, the CLK 13 obtained by multiplying the frequency of the CLK 10 through the PLL circuit 170 may be used as the clock of the first control signal generation unit 100 and the second control signal generation unit 120. Alternatively, as the clock of the second control signal generation unit 120, a clock obtained by inverting the CLK 13 obtained by multiplying the frequency of the CLK 10 through the PLL circuit 170 or a clock obtained by inverting the CLK 10 may be used.

Furthermore, the bus converter may be configured such that the first internal output control signal 21 of the bus signal control unit 300g in FIG. 8A, the second internal output control signal 22 of the bus signal control unit 300g in FIG. 8A, and any one of the second internal output control signal 22 of the bus signal control unit 300c in FIG. 4A, the second internal output control signal 22 of the bus signal control unit 300d in FIG. 5A, and the second internal output control signal 22 of the bus signal control unit 300e in FIG. 6A are input to the three input terminals of the selector provided as the selector 140, respectively, so as to select the presence or absence of the time difference between the outputs of the address and data signals and the size of the time difference. In this case, the presence or absence of the time difference between the outputs of the address and data signals and the size of the time difference may be selected, for example, by the use of two selection signals.

Eighth Embodiment

When a bus signal is shifted in a case where the address signals or the data signals are sequentially arranged in the bus converter 3f according to the sixth embodiment, the simultaneous switching noise is locally generated in the vicinity of the address signals or the data signals. Furthermore, when the address and data signals are shifted in a case where the odd-numbered terminals or the even-numbered terminals of the address signals or the data signals are sequentially arranged in the bus converter 3g according to the seventh embodiment, the simultaneous switching noise is locally generated in the vicinity of the sequentially-arranged signals.

According to an eighth embodiment, odd-numbered terminals of asynchronous bus signals or connector terminals among the address and data signals are allocated to the first internal output control signal 21, whereas even-numbered terminals of the asynchronous bus signals or the connector terminals thereamong are allocated to the second internal output terminal 22.

FIG. 9C is a table showing an example of the terminal arrangement of a PC Card slot. Here, the terminals of the PC Card slot in FIG. 9C are arranged in a terminal order as an example. That is, the odd-numbered terminals in FIG. 9C are allocated to the first internal output control signal 21, whereas the even-numbered terminals in FIG. 9C are allocated to the second internal output control signal 21.

Figure 9A:
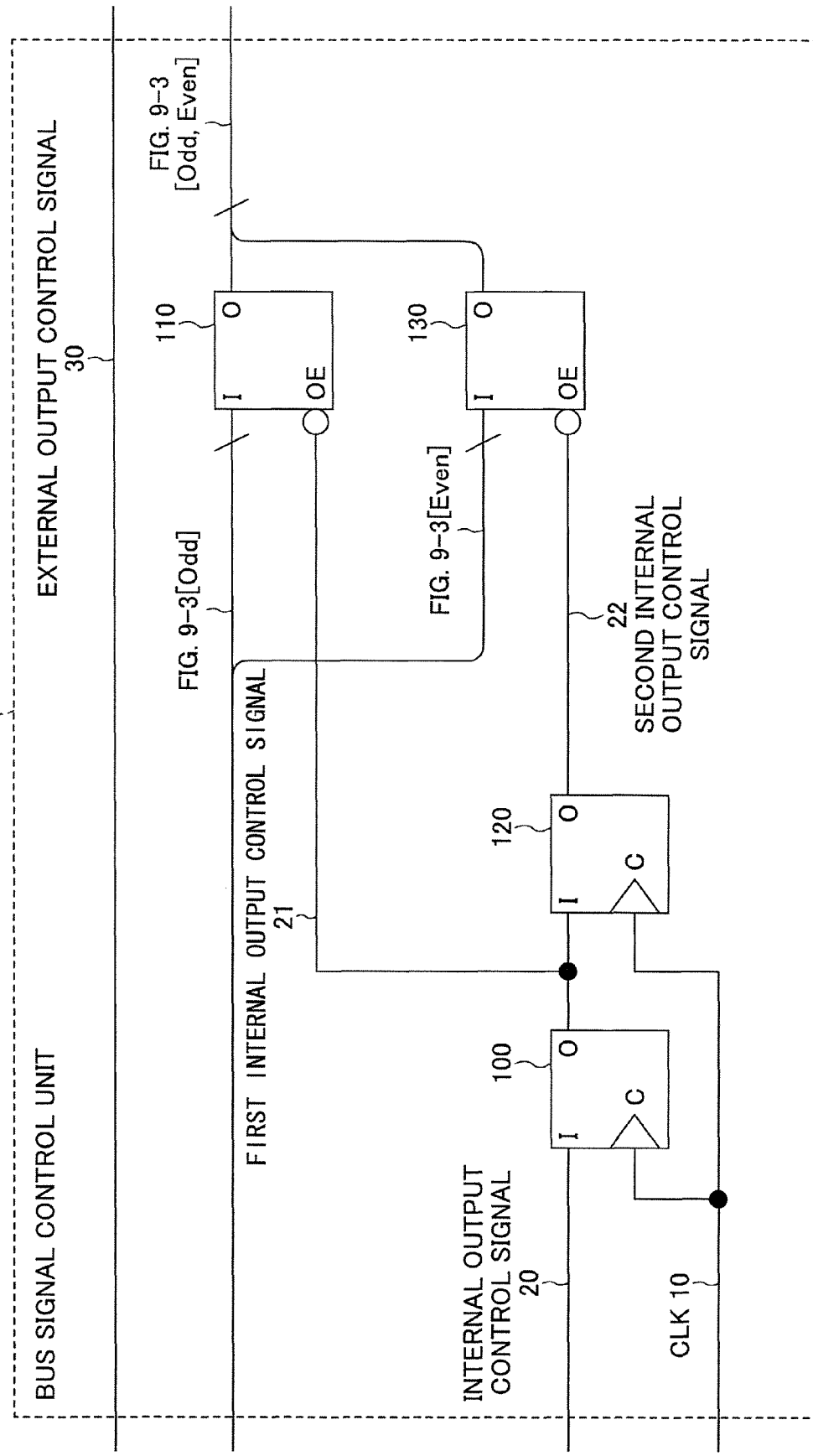
FIG. 9A is a diagram showing a configuration example of a bus signal control unit 300h in a bus converter 3h according to an eighth embodiment of the present invention.

FIG. 9A is a diagram showing a configuration example of a bus signal control unit 300h in a bus converter 3h according to the eighth embodiment of the present invention. The bus converter 3h (not shown) according to the eighth embodiment is connected to the synchronous bus 2 and the asynchronous bus 4 as in the bus converter 3a in FIG. 1A and converts the signal of the synchronous bus 2 into the signal of the asynchronous bus 4. The bus converter 3h is composed of a bus conversion logic circuit 200h and a bus signal control unit 300h, but it has the same configuration as the bus converter 3a in FIG. 1A except for the bus signal control unit 300h. Therefore, only the bus signal control unit 300h is shown in FIG. 9A. In FIG. 9A, parts the same as or similar to those in FIG. 1A are given the same reference numerals and a description thereof is omitted. The bus signal control unit 300h in FIG. 9A is different from the bus signal control unit 300a in FIG. 1A in that the odd-numbered terminals (the odd-numbered terminals (ODD) in FIG. 9C) of the asynchronous bus signals or the connector terminals among the address and data signals are allocated to the first internal output control signal 21, whereas the even-numbered terminals (the even-numbered terminals (EVEN) in FIG. 9C) thereamong are allocated to the second internal output control signal 22.

FIG. 9B is a diagram showing an example of a timing chart of the bus signal control unit 300h in FIG. 9A. As shown in FIG. 9B, it is possible to prevent the local simultaneous switching noise generated when the address signals or the data signals are sequentially arranged such as a case where 11 address signals from the terminal 19 to the terminal 29 are sequentially arranged in FIG. 9C. Moreover, it is possible to prevent the local simultaneous switching noise generated when the odd-numbered terminals or the even-numbered terminals of the address signals or the data signals are sequentially arranged such as a case where two even-numbered terminals from the terminal 29 to terminal 30 are sequentially arranged in FIG. 9C.

Furthermore, in the same manner as with the case of configuring the bus signal control unit 300b of the bus converter 3b in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300h in FIG. 9A constituting the bus converter 3h according to the eighth embodiment. At this time, the CLK 13 obtained by multiplying the frequency of the CLK 10 through the PLL circuit 170 may be used as the clock of the first control signal generation unit 100 and the second control signal generation unit 120. Alternatively, as the clock of the second control signal generation unit 120, a clock obtained by inverting the CLK 13 obtained by multiplying the frequency of the CLK 10 through the PLL circuit 170 or a clock obtained by inverting the CLK 10 may be used.

Furthermore, the bus converter may be configured such that the first internal output control signal 21 of the bus signal control unit 300h in FIG. 9A, the second internal output control signal 22 of the bus signal control unit 300h in FIG. 8A, and any one of the second internal output control signal 22 of the bus signal control unit 300c in FIG. 4A, the second internal output control signal 22 of the bus signal control unit 300d in FIG. 5A, and the second internal output control signal 22 of the bus signal control unit 300e in FIG. 6A are input to the three input terminals of the selector provided as the selector 140, respectively, so as to select the presence or absence of the time difference between the outputs of the address and data signals and the size of a time difference. In this case, the presence or absence of the time difference between the outputs of the address and data signals and the size of the time difference may be selected, for example, by the use of two selection signals.

Ninth Embodiment

The arrangement of terminals in a PC Card connector is a two-stage type in which the terminals 1 through 34 and the terminals 35 through 68 are allocated to an upper stage and a lower stage, respectively. In this case, wirings are alternately arranged on a substrate such that the terminals 1, 2, , , , 33, and 34 are followed by 35, 36, , , , 67, and 68, respectively. In other words, the terminals 1 through 34 are odd-numbered signals in the order arranged on the substrate, whereas the terminals 35 through 68 are even-numbered signals in the order arranged on the substrate.

In this case, according to the sixth embodiment, when the address signals or the data signals are shifted in a case where the address signals or the data signals are sequentially arranged, the simultaneous switching noise is locally generated in the vicinity of the address signals or the data signals. Furthermore, according to the seventh embodiment, when the odd-numbered terminals or the even-numbered terminals are shifted in a case where the odd-numbered terminals or the even-numbered terminals are sequentially arranged, the simultaneous switching noise is locally generated in the vicinity of the sequentially-arranged signals. Moreover, according to the eighth embodiment, when the address signals or the data signals are shifted in a case where the odd-numbered terminals or the even-numbered terminals of the asynchronous bus signals or the connector terminals are sequentially arranged, the simultaneous switching noise is locally generated in the vicinity of the sequentially arranged signals.

According to the ninth embodiment, the odd-number signals in the order arranged on the substrate among the address and data signals are allocated to the first internal output control signal 21, whereas the even-numbered signals in the order arranged on the substrate thereamong are allocated to the second internal output control signal 22. As an example, the terminals of a PC Card slot in FIG. 9C are arranged in the order such that the terminals 1 through 34 are allocated to the first internal output control signal 21, whereas the terminals 35 through 68 are allocated to the second internal output control signal 22 as shown in FIG. 10A.

FIG. 10A is a diagram showing a configuration example of a bus signal control unit 300i in a bus converter 3i according to the ninth embodiment of the present invention. The bus converter 3i (not shown) according to the ninth embodiment is connected to the synchronous bus 2 and the asynchronous bus 4 as in the bus converter 3a in FIG. 1A and converts the signal of the synchronous bus 2 into the signal of the asynchronous bus 4. The bus converter 3*i* is composed of a bus conversion logic circuit 200*i* and a bus signal control unit 300*i*, but it has the same configuration as the bus converter 3*a* in FIG. 1A except for the bus signal control unit 300*i*. Therefore, only the bus signal control unit 300*i* is shown in FIG. 10A. In FIG. 10A, parts the same as or similar to those in FIG. 1A are given the same reference numerals and a description thereof is omitted. The bus signal control unit 300*i* in FIG. 10A is different from the bus signal control unit 300*a* in FIG. 1A in that the odd-number signals [34:1] in the order arranged on the substrate among the address and data signals in FIG. 9C are allocated to the first internal output control signal 21, whereas the even-numbered signals [68:35] in the order arranged on the substrate thereamong in FIG. 9C are allocated to the second internal output control signal 22.

FIG. 10B is a diagram showing an example of a timing chart of the bus signal control unit 300*i* in FIG. 10A. As shown in FIG. 10B, it is possible to prevent the simultaneous switching noise generated when the address signals or the data signals are sequentially arranged, such as a case where eight data signals consisting of the terminals 3 through 6 and the terminals 37 through 40 and nine address signals consisting of the terminals 19 through 23 and the terminals 53 through 56 are sequentially arranged in FIG. 9C. Furthermore, it is possible to prevent the simultaneous switching noise generated when the odd-numbered terminals or the even-numbered terminals of the address signals or the data signals are sequentially arranged, such as a case where two odd-numbered terminals consisting of the terminals 4 and 37 and even-numbered terminals consisting of the terminals 19 and 53 are sequentially arranged in FIG. 9C. Moreover, it is possible to prevent the simultaneous switching noise generated when the odd-numbered terminals or the even-numbered terminals of the connector terminals are sequentially arranged, such as a case where the odd-numbered terminals of two connector terminals consisting of the terminals 3 and 37 and the even-numbered terminals of two connector terminals consisting of the terminals 20 and 54 are sequentially arranged in FIG. 9C.

Note that the arrangement order of the signal wirings is used in the ninth embodiment, but it is also possible to use the arrangement of terminals and signals of electronic components used for data transmission, the arrangement of connector terminals, the arrangement of bus signals, etc.

Furthermore, in the same manner as with the case of configuring the bus signal control unit 300*b* of the bus converter 3*b* in FIG. 3A by adding the selector 140 to the bus signal control unit 300*a* of the bus converter 3*a* in FIG. 1A in the second embodiment, the presence or absence of the time difference between the outputs of the address and data signals may be selected by adding the selector 140 to the bus signal control unit 300*i* in FIG. 10A constituting the bus converter 3*i* according to the ninth embodiment. At this time, the CLK 13 obtained by multiplying the frequency of the CLK 10 through the PLL circuit 170 may be used as the clock of the first control signal generation unit 100 and the second control signal generation unit 120. Alternatively, as the clock of the second control signal generation unit 120, a clock obtained by inverting the CLK 13 obtained by multiplying the frequency of the CLK 10 through the PLL circuit 170 or a clock obtained by inverting the CLK 10 may be used.

Furthermore, the bus converter may be configured such that the first internal output control signal 21 of the bus signal control unit 300*i* in FIG. 10A, the second internal output control signal 22 of the bus signal control unit 300*i* in FIG. 10A, and any one of the second internal output control signal 22 of the bus signal control unit 300*c* in FIG. 4A, the second internal output control signal 22 of the bus signal control unit 300*d* in FIG. 5A, and the second internal output control signal 22 of the bus signal control unit 300*e* in FIG. 6A are input to the three input terminals of the selector provided as the selector 140, respectively, so as to select the presence or absence of the time difference between the outputs of the address and data signals and the size of the time difference. In this case, the presence or absence of the time difference between the outputs of the address and data signals and the size of the time difference may be selected, for example, by the use of two selection signals.

Tenth Embodiment

As shown in the first embodiment, when the simultaneous switching noise is transmitted to the control signal (for example, the signal such as WE# that is the external output control signal) of the asynchronous bus, a malfunction in the system is caused. Therefore, according to a tenth embodiment, signals adjacent to or in the vicinity of the control signal among the address and data signals are allocated to the first internal output control signal 21 as a wiring pattern on the substrate in the semiconductor device on which the bus converter is mounted, thereby preventing the transmission of the simultaneous switching noise to the control signal.

As an example, a description is made of a case where the transmission of the simultaneous switching noise to the WE# of the PC Card is prevented. As shown in the first embodiment in FIGS. 2A and 2B, the conventional bus converter 3*z* may cause a malfunction of the system when the simultaneous switching noise is transmitted to the WE# as the external output control signal 30. According to the tenth embodiment, the signals adjacent to or in the vicinity of the WE# as the control signal are allocated to the first internal output control signal 21 as the wiring pattern on the substrate. With this configuration, a shielding effect relative to the simultaneous switching noise is produced when those signals are shifted.

For example, according to the ninth embodiment in FIG. 9C, the signals are alternately arranged on the substrate such that the terminals 1, 2, 33, and 34 are followed by the terminals 35, 36, 67, and 68, respectively. Therefore, in FIG. 9C, the WE# signal allocated to the terminal 15 in the PC Card slot 15 is adjacently arranged between A19 of the terminal 48 and A20 of the terminal 49 on the substrate (where the WE# signal is adjacent to A19 and A20 is represented as "WE#: terminal n," "A19: terminal n−1," and "A20: terminal n+1"). As shown in FIGS. 2A and 2B, all the bus signals including A19 and A20 are simultaneously shifted in the conventional bus converter 3*z*. Therefore, a noise component including the simultaneous switching noise of A19 and A20 is transmitted to the WE# signal.

FIG. 11A is a diagram showing a configuration example of a bus signal control unit 300*j* in a bus converter 3*j* according to the tenth embodiment of the present invention. The bus converter 3*j* (not shown) according to the tenth embodiment is connected to the synchronous bus 2 and the asynchronous bus 4 as in the bus converter 3*a* in FIG. 1A and converts the signal of the synchronous bus 2 into the signal of the asynchronous bus 4. The bus converter 3*j* is composed of a bus conversion logic circuit 200*j* and a bus signal control unit 300*j*, but it has the same configuration as the bus converter 3*a* in FIG. 1A except for the bus signal control unit 300*j*. Therefore, only the bus signal control unit 300*j* is shown in FIG. 11A. In FIG. 11A, parts the same as or similar to those in FIG. 1A are given the same reference numerals and a description thereof is omitted. The bus signal control unit 300*j* in FIG. 11A is different from the bus signal control unit 300a in FIG. 1A in that, where the WE# is defined as the terminal n, only two signals (Bus [n−1 and n+1]) consisting of A19 (terminal n−1) adjacent to the terminal n on the substrate and A20 (terminal n+1) adjacent to the terminal n on the substrate are allocated to the first internal output control signal 21, whereas other signals (Bus [Others]) are allocated to the second internal output control signal 22.

FIG. 11B is a diagram showing an example of a timing chart of the bus signal control unit 300j in FIG. 11A.

As shown in FIG. 11B, when bus signals other than A19 and A20 are shifted, A19 and A20 are shifted before or after these other bus signals involved are shifted. Therefore, the simultaneous switching noise is transmitted to A19 and A20 and then turns into switching noise. At this time, the switching noise transmitted to A19 and A20 is further transmitted to the WE#. However, the noise level is attenuated when the simultaneous switching noise is transmitted to A19 and A20, thereby reducing the influence of the noise on the WE#. Moreover, in the conventional bus converter 3z in FIG. 2A, the closest noise sources are A19 and A20. However, in the bus converter 3j according to the tenth embodiment, the noise sources are not A19 and A20, but are A14 and A21 the second closest to the WE# following A20 and A21 on the substrate. Therefore, because the distance to the noise sources becomes double or more and noise level propagates inversely proportional to the square of the distance, the influence of the simultaneous switching noise on the WE# is reduced.

Furthermore, besides A19 and A20 adjacent to the WE# on the substrate, A14 and A21 adjacent to A19 and 20 may be allocated to the first internal output control signal 21.

According to related art techniques, when an important signal is protected from switching noise, a (non-switching) GND and a power supply are provided on both sides of a wiring pattern of the important signal. However, this method causes an increase in an arrangement area on the board by an amount corresponding to the wiring of the GND or the power supply. According to the tenth embodiment, the address and data signals that are shifted with a time difference are arranged only on both sides of the important signal pattern. Accordingly, the influence of the simultaneous switching noise on the WE# or the like is reduced as described above. In addition, the increase in the arrangement area on the board by the amount corresponding to the wiring of the GND or the power supply is eliminated.

Furthermore, in the same manner as with the case of configuring the bus signal control unit 300b of the bus converter 3b in FIG. 3A by adding the selector 140 to the bus signal control unit 300a of the bus converter 3a in FIG. 1A in the second embodiment, the presence or absence of the time difference between the outputs of the address and data signals may be selected by adding the selector 140 to the bus signal control unit 300j in FIG. 11A constituting the bus converter 3j according to the ninth embodiment. At this time, the CLK 13 obtained by multiplying the frequency of the CLK 10 through the PLL circuit 170 may be used as the clock of the first control signal generation unit 100 and the second control signal generation unit 120. Alternatively, as the clock of the second control signal generation unit 120, a clock obtained by inverting the CLK 13 obtained by multiplying the frequency of the CLK 10 through the PLL circuit 170 or a clock obtained by inverting the CLK 10 may be used.

Furthermore, the bus converter may be configured such that the first internal output control signal 21 of the bus signal control unit 300j in FIG. 11A, the second internal output control signal 22 of the bus signal control unit 300j in FIG. 11A, and any one of the second internal output control signal 22 of the bus signal control unit 300c in FIG. 4A, the second internal output control signal 22 of the bus signal control unit 300d in FIG. 5A, and the second internal output control signal 22 of the bus signal control unit 300e in FIG. 6A are input to the three input terminals of the selector provided as the selector 140, respectively, so as to select the presence or absence of the time difference between the outputs of the address and data signals and the size of the time difference. In this case, the presence or absence of the time difference between the outputs of the address and data signals and the size of the time difference may be selected, for example, by the use of two selection signals.

Eleventh Embodiment

FIG. 12A is a diagram showing an example of a timing chart of the conventional bus converter 3z in FIG. 2A. Assume that address and data signals (a first external output signal and a second external output signal) allocated to adjacent wiring patterns on a substrate are simultaneously shifted in the same way in the semiconductor device on which the bus converter 3z is mounted. For example, as shown in FIG. 12A, in the case of the conventional bus converter 3z in FIG. 2A, a differential component (the first external output signal−the second external output signal) of the voltages of the adjacent signals (the first external output signal and the second external output signal) becomes constant and thus a potential difference including a frequency component is not generated. Even if parasitic capacitance exists between the first external output signal and the second external output signal, a noise component is not absorbed in the parasitic capacitance. Therefore, the transmission of the switching noise caused in a signal is not blocked by the adjacent signals. That is, the switching noise is transmitted beyond the adjacent signals.

FIG. 12B is a diagram showing an example of a timing chart of the bus converter 3a in FIG. 1A. For example, in the case of the bus converter 3a according to the first embodiment in FIG. 1A, the time difference exists between the change point of the first internal output control signal 21 and that of the second internal output control signal 22. At this time, when the first external output signal and the second external output signal, which are the address and data signals allocated to the adjacent wiring patterns on the substrate, are set to be the first internal output control signal 21 and the second internal output control signal 22, respectively, and the address and data signals (the first external output signal and the second external output signal) are shifted from the H-state to the L-state, as shown in FIG. 12B, the differential component (the first external output signal—the second external output signal) of the voltages of the adjacent signals does not become constant. In addition, a potential difference including a frequency component having the time difference between the change point of the first internal output control signal 21 and that of the second internal output control signal 22 as a cycle is generated.

Here, if the value of the parasitic capacitance existing between the respective wiring patterns of the first external output signal and the second external output signal, which are the address and data signals allocated to the adjacent wiring patterns on the substrate, is previously set to have an optimum value for absorbing noise of the frequency component having the time difference between the change point of the first internal output control signal 21 and that of the second internal output control signal 22 as the cycle, it is possible to make the noise be absorbed in the respective wiring patterns.

As an example shown in FIG. 12B, the first external output signal controlled by the first internal output control signal 21 is first shifted. At this time, the potential difference including the frequency component based on the shift of the first external output signal is generated between the first external output signal and the second external output signal. Then, the noise of the corresponding frequency component is transmitted to and absorbed in the second external output signal by the parasitic capacitance existing between the wiring patterns of the first external output signal and the second external output signal. In other words, the frequency component is not transmitted to other signals or the like, thereby making it possible to reduce the influence of the noise.

Likewise, when the second external output signal controlled by the second internal output signal 22 is shifted, the noise of the corresponding frequency component is transmitted to and absorbed in the first external output signal by the parasitic capacitance existing between the wiring patterns of the first external output signal and the second output signal.

Furthermore, if the value of the parasitic capacitance existing between the wiring patterns of all the adjacent bus signals is set to have the optimum value for absorbing the noise of the frequency component having the time difference between the change point of the first internal output control signal 21 and that of the second internal output control signal 22 as the cycle, it is possible to reduce the simultaneous switching noise corresponding to a total noise amount of all the signals.

Here, assume that the frequency component having the time difference between the change point of the first internal output control signal 21 and that of the second internal output control signal 22 as the cycle is represented as "f," the optimum value of the parasitic capacitance for absorbing the noise of the frequency component f is represented as "C," and the inductance of the wiring pattern is represented as "L," the formula "$f=1/(2\pi\sqrt{LC})$" is established. This formula can be transformed into "$C=1/(4\pi^2 f^2 L)$." In other words, if the value of the parasitic capacitance existing between the adjacent wiring patterns is set to be either "$C=1/(4\pi^2 f^2 L)$" or an approximate value thereof, it is possible to absorb the noise of the frequency component f.

Furthermore, the value of the parasitic capacitance existing between the adjacent wiring patterns is obtained by the formula, (value of parasitic capacitance)=(thickness of wiring pattern)×(length of wiring pattern)/(square of distance between adjacent wiring patterns). However, due to restrictions as to designs of a semiconductor device, the thickness and the length of a wiring pattern has generally a small degree of freedom in design. In order to deal with this, the distance between the adjacent wiring patterns is adjusted to set the value of the parasitic capacitance to be a desired value.

As described above, the potential difference including the frequency component having the time difference between the change point of the first internal output control signal 21 and that of the second internal output control signal 22 as the cycle is generated. In addition, the parasitic capacitance between the wiring patterns of the adjacent bus signals is set to have the value capable of absorbing the noise of the corresponding frequency component. With these configurations, it is possible to absorb the noise of the frequency component corresponding to the parasitic capacitance. As a result, the transmission of the noise of the frequency component to other bus signals can be prevented, thus making it possible to reduce switching noise in respective signals and the simultaneous switching noise in all the bus signals.

Note that in addition to the optimum value for absorbing the noise of the frequency component having the time difference between the change point of the first internal output control signal 21 and that of the second internal output control signal 22 as the cycle, the parasitic capacitance may be set to have an optimum value for absorbing a frequency component of the undershoot or the overshoot generated when a bus signal is shifted or may be set to have an optimum value for absorbing the noise of a frequency component based on the rise time and the fall time of a bus signal.

Furthermore, according to the eleventh embodiment, assume that a malfunction (an unexpected shifting noise) is not caused due to cross talk (noise to be transmitted to adjacent signals) even if only one of the adjacent signals is shifted. In other words, cross talk noise that does not unexpectedly shift noise to adjacent signals is intentionally caused and absorbed in respective adjacent wiring patterns. Accordingly, the transmission of the noise to other signals is prevented.

As shown in the embodiments 1 through 11, the present invention makes it possible to provide the bus converter capable of reducing the simultaneous switching noise, the semiconductor device on which the bus converter is mounted, and the method of reducing the simultaneous switching noise of the bus converter and the semiconductor device on which the bus converter is mounted, in a manner so as not to arrange a buffer for generating a time difference between signals and not to change the electrical characteristics of a buffer.

The present invention is not limited to the specifically disclosed embodiments, but variations and modifications may be made without departing from the scope of the present invention.

For example, the respective embodiments of the present invention describe a case where the PCI bus as the synchronous bus is switched to the 16 bit PC Card as the asynchronous bus. However, the embodiments of the present invention are applicable without being limited to these buses so long as data transmission is switched from the synchronous bus to the asynchronous bus.

Furthermore, according to the respective embodiments of the present invention, the two internal output signals having different timings are generated and the bus signals including the address and data signals are allocated to the two internal output signals, thereby reducing the simultaneous switching noise. To this end, it is also possible to allocate the bus signals including the address and data signals to three or more internal output control signals having different timings.

Furthermore, a specific numerical value such as "1.4 V" is used in the respective embodiments of the present invention, but it is intended to facilitate the understanding of the specification. The present invention is applicable without being limited to the numerical values described in the respective embodiments.

The present application is based on Japanese Priority Application No. 2007-192152 filed on Jul. 24, 2007, the entire contents of which are hereby incorporated herein by reference.

What is claimed is:

1. A bus converter that converts a signal of a synchronous bus into a signal of an asynchronous bus, the bus converter comprising:
   the bus converter being positioned between the synchronous bus and the asynchronous bus;
   a plurality of control signal generation units that generate n control signals synchronized at different timings of a predetermined synchronization signal, where n is an integer of two or more; and
   a plurality of output units, connected to outputs of the control signal generation units, that output the signal of the synchronous bus to the asynchronous bus, wherein when the plurality of output units are simultaneously switched, noise results which is in proportion to the amount of output units that are simultaneously switched, wherein the signal of the synchronous bus is divided into n signal groups based on control information derived from the n control signals;

thereby reducing the noise due to the simultaneous switching.

2. The bus converter according to claim 1, wherein
the predetermined synchronization signal is a synchronization signal of the synchronous bus.

3. The bus converter according to claim 1, wherein
the predetermined synchronization signal includes plural synchronization signals including a first synchronization signal having a predetermined frequency and a second synchronization signal having a frequency higher than the frequency of the first synchronization signal.

4. The bus converter according to claim 1, wherein
the predetermined synchronization signal includes plural synchronization signals including a first synchronization signal and a second synchronization signal having a phase inverted relative to a phase of the first synchronization signal.

5. The bus converter according to claim 1, further comprising:
a multiplication unit that multiplies a frequency of a synchronization signal of the synchronous bus; wherein
the predetermined synchronization signal is a synchronization signal obtained by multiplying the frequency of the synchronization signal of the synchronous bus with the multiplication unit.

6. The bus converter according to claim 1, further comprising:
a selection unit that selectively switches an output of the n signal groups between a first subset at a substantially same timing and a second subset at a different, delayed timing.

7. A semiconductor device comprising:
a substrate; and
the bus converter according to claim 1 mounted on the substrate.

8. The semiconductor device according to claim 7, wherein
an address signal or a data signal allocated to a mutually adjacent wiring pattern and included in the signal of the synchronous bus is set to be in a mutually different signal group.

9. The semiconductor device according to claim 7, wherein
an address signal or a data signal allocated to a wiring pattern adjacent to another wiring pattern as a control signal included in the signal of the synchronous bus and included in the signal of the synchronous bus is set to be in a signal group different from other signals included in the synchronous bus.

10. The semiconductor device according to claim 7, wherein
parasitic capacitance that absorbs noise having a time difference between shifts of the n control signals as a cycle is generated between wiring patterns of address signals and data signals allocated to mutually adjacent wiring patterns and included in the signal of the synchronous bus.

11. A noise reduction method for reducing noise caused when a signal of a synchronous bus is converted into a signal of an asynchronous bus, the noise reduction method comprising the steps of:
generating n control signals synchronized at different timings of a predetermined synchronization signal, where n is an integer of two or more; and
outputting the signal of the synchronous bus to the asynchronous bus via a plurality of output units, wherein when the plurality of output units are simultaneously switched, noise results which is in proportion to the amount of output units that are simultaneously switched,
wherein the signal of the synchronous bus is divided into n signal groups based on control information derived from the n control signals;
thereby reducing the noise due to the simultaneous switching.

12. The noise reduction method according to claim 11, wherein
the predetermined synchronization signal is a synchronization signal of the synchronous bus.

13. The noise reduction method according to claim 11, wherein
the predetermined synchronization signal includes plural synchronization signals containing a first synchronization signal having a predetermined frequency and a second synchronization signal having a frequency higher than the frequency of the first synchronization signal.

14. The noise reduction method according to claim 11, wherein
the predetermined synchronization signal includes plural synchronization signals containing a first synchronization signal and a second synchronization signal having a phase inverted relative to a phase of the first synchronization signal.

15. The noise reduction method according to claim 11 wherein
the predetermined synchronization signal is a synchronization signal obtained by multiplying the frequency of the synchronization signal of the synchronous bus with a multiplication unit.

16. The noise reduction method according to claim 11, further comprising:
selectively switching an output of the n signal groups between a first subset at a substantially same timing and a second subset at a different, delayed timing.

17. A semiconductor device that uses the noise reduction method according to claim 11.

18. The semiconductor device according to claim 17, wherein
an address signal or a data signal allocated to a mutually adjacent wiring pattern and included in the signal of the synchronous bus is set to be in a mutually different signal group.

19. The semiconductor device according to claim 17, wherein
an address signal or a data signal allocated to a wiring pattern adjacent to another wiring pattern as a control signal included in the signal of the synchronous bus and included in the signal of the synchronous bus is set to be in a signal group different from other signals included in the synchronous bus.

20. The semiconductor device according to claim 17, wherein
parasitic capacitance that absorbs noise having a time difference between shifts of the n control signals as a cycle is generated between wiring patterns of address signals and data signals allocated to mutually adjacent wiring patterns and included in the signal of the synchronous bus.

* * * * *